US008985406B2

(12) United States Patent
Tachi

(10) Patent No.: US 8,985,406 B2
(45) Date of Patent: Mar. 24, 2015

(54) PLUG FOR USE IN A BEVERAGE CONTAINER

(71) Applicant: Katsuaki Tachi, Tsubame (JP)

(72) Inventor: Katsuaki Tachi, Tsubame (JP)

(73) Assignees: Thermos L.L.C., Schaumburg, IL (US); Thermos K.K. (JP)

( * ) Notice: Subject to any disclaimer, the term of this patent is extended or adjusted under 35 U.S.C. 154(b) by 138 days.

(21) Appl. No.: 13/907,526

(22) Filed: May 31, 2013

(65) Prior Publication Data

US 2013/0320011 A1 Dec. 5, 2013

(30) Foreign Application Priority Data

Jun. 4, 2012 (JP) ................................. 2012-127508

(51) Int. Cl.
| A47G 19/00 | (2006.01) |
| A47G 19/12 | (2006.01) |
| B65D 83/00 | (2006.01) |
| B67D 3/00 | (2006.01) |
| B67D 7/06 | (2010.01) |
| F16K 35/00 | (2006.01) |
| B65D 59/02 | (2006.01) |
| A47J 41/00 | (2006.01) |

(52) U.S. Cl.
CPC ............. *B65D 59/02* (2013.01); *A47J 41/0027* (2013.01)
USPC .............................. 222/472; 222/517; 251/95

(58) Field of Classification Search
USPC ................. 222/472, 517, 465.1, 473, 153.01, 222/153.12, 153.14; 251/89–116; 220/212
See application file for complete search history.

(56) References Cited

U.S. PATENT DOCUMENTS

| 11,276 | A | * | 7/1854 | Thompson ....................... 251/95 |
| 5,037,015 | A | * | 8/1991 | Collins ........................ 222/472 |
| 5,615,808 | A | * | 4/1997 | Huang ......................... 222/472 |
| 5,947,343 | A | * | 9/1999 | Horstmann .................... 222/474 |
| 6,805,266 | B2 | * | 10/2004 | Doron et al. .................. 222/475 |
| 6,935,536 | B2 | * | 8/2005 | Tardif ....................... 222/153.14 |
| 2002/0063141 | A1 | * | 5/2002 | Hirose et al. .................. 222/131 |

(Continued)

FOREIGN PATENT DOCUMENTS

| JP | 2002-165709 | 6/2002 |
| JP | 2004315009 | 11/2004 |
| JP | 4514692 | 5/2010 |

OTHER PUBLICATIONS

Communication regarding the Extended European Search Report, dated Aug. 29, 2013, 4 pages.
English language translation of the Abstract of Japanese Patent Application Publication No. 2007-135891 (Japanese Application No. JP 2005-334297, now issued as Japanese Patent No. JP 4514692 as listed above).

(Continued)

*Primary Examiner* — J. Casimer Jacyna
*Assistant Examiner* — Benjamin R Shaw
(74) *Attorney, Agent, or Firm* — Polsinelli PC

(57) ABSTRACT

The plug includes: a resilient member that is provided on the valve body and serves to bias the valve body in a closing direction; a valve body cover attached to the valve body in order to prevent the resilient member from coming of a rotation member rotatably provided on the valve body cover; at least two engagement claw portions that are provided on the rotation member and serve to allow the valve body cover to be engaged with an upper portion of the valve body; and claw guiding grooves and the recessed grooves serving as steps that are provided on an upper portion of the valve body, the number of the claw guiding grooves being equal to the number of or the integral multiple of the engagement claw portions, the recessed grooves allowing the rotation member to rotate.

11 Claims, 16 Drawing Sheets

(56) References Cited

U.S. PATENT DOCUMENTS

2003/0150886 A1* 8/2003 Nybakke ................ 222/472
2007/0295760 A1* 12/2007 Geroult et al. ............ 222/472

OTHER PUBLICATIONS

English language translation of the Abstract of Japanese Patent Application Publication No. 2002-165709 (Japanese Application No. JP 2000-364901).

* cited by examiner

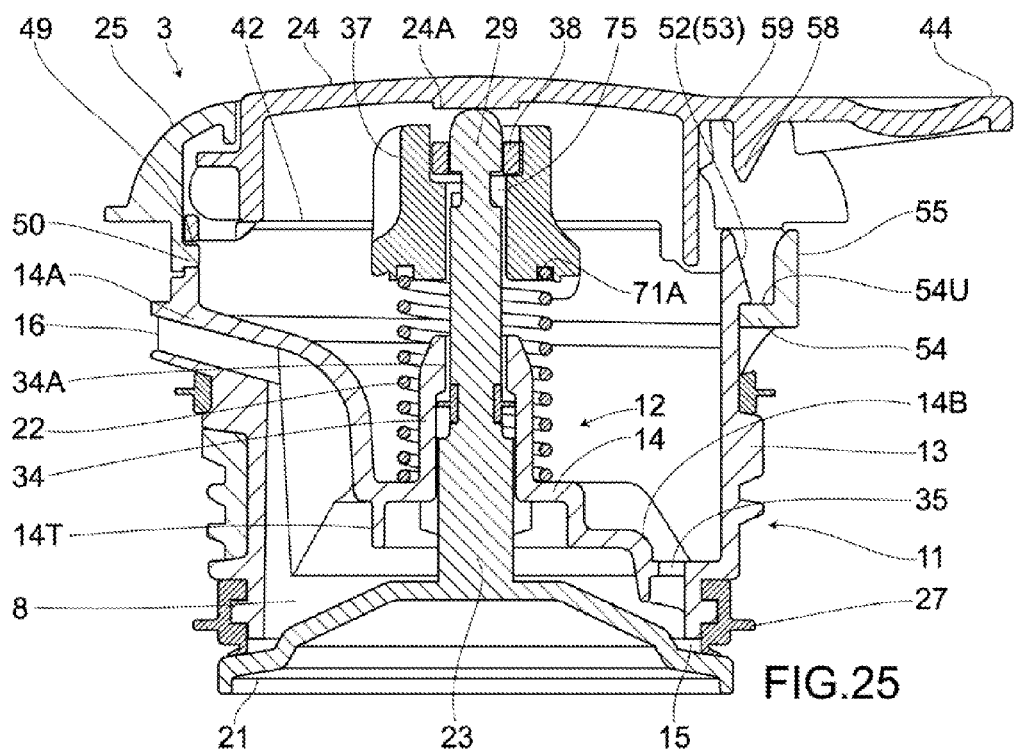
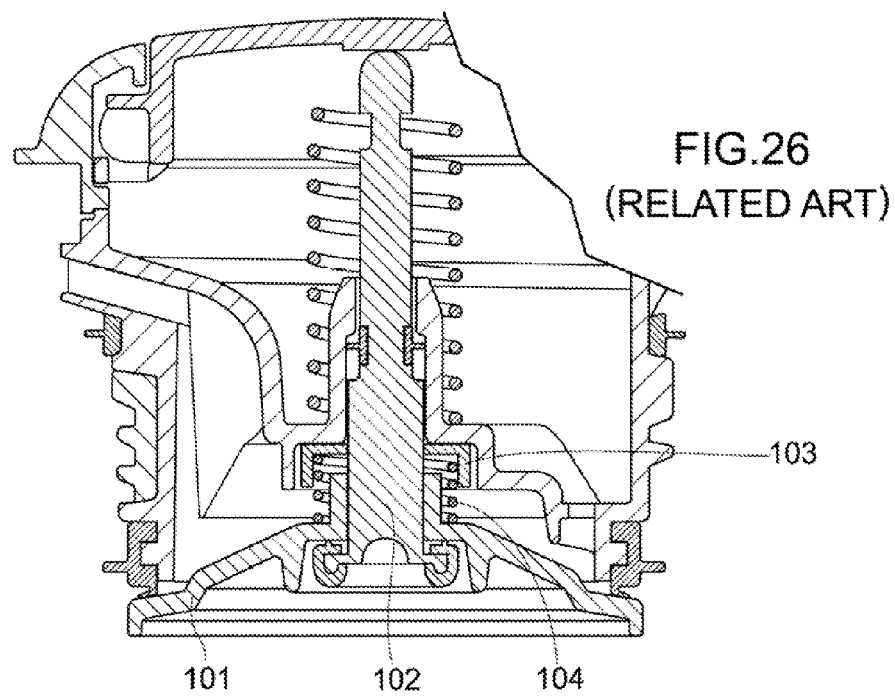
FIG. 25
FIG. 26 (RELATED ART)

PLUG FOR USE IN A BEVERAGE CONTAINER

BACKGROUND OF THE INVENTION

1. Field of the Invention

The present invention relates to a plug for use in a beverage container such as a thermos bottle. Particularly, the present invention relates to a plug having a valve structure, and allowing a content fluid to be poured out when attached to a beverage container.

2. Description of Related Art

Conventionally, a plug for use in a beverage container comprises a plug main body having a fluid passage allowing a content fluid to be poured therethrough when tilting the beverage container and a valve structure capable of opening and sealing the fluid passage. The valve structure includes: a valve shall provided in the plug main body and capable of moving up and down; a valve body supported in a lower end of the valve shaft and capable of opening and sealing the fluid passage; a biasing means biasing the valve body in a sealing direction; and a control lever allowing the valve body to be opened when pushed down against a biasing force generated by the biasing means. The plug main body includes an opening formed in as top panel and allowing a pushing portion of the control lever to be protruded outward.

Such plug easily becomes dirty with boiler scale or the like because the content fluid contacts the valve body and/or the valve shaft when poured. In order to wash the valve body, the valve shaft and the fluid passage, the plug is disassembled and then washed. For example, a plug for use in a beverage container disclosed in Japanese Unexamined Patent Application Publication No. 2002-65709 includes: a pair of engagement arms provided on a base end of a control lever abutted onto as distal end of a valve shaft; an insert hole formed on each engagement arm; a shaft pivotably supporting the control lever relative to a plug main body and inserted into the insert hole; a guide groove formed at a lower portion of the insert hole and guiding the shaft to the insert hole; and a boss formed in a hemisphere shape and protruded adjacent to the insert hole. When washing this plug, 1) rotating the control lever in an anti-operational direction, 2) taking out the shaft from the insert hole and then removing the control lever by widening a distance between engagement arms using the boss, 3) taking out the valve shaft, the valve body and the biasing means from the plug main body, and then allowing the valve structure to be washed.

Further, as a plug of such kind, there has been disclosed an inner plug structure (e.g., Japanese Patent No. 4514692) for use in a fluid container. This inner plug structure includes: an inner plug main body detachably attached to an opening section of a container main body; a fluid passage that is thrilled inside the inner plug main body, and connects an inlet and an outlet that are respectively opened toward an inner side and an outer side of the container main body; a valve body biased in a direction allowing the inlet of the fluid passage to be closed; a cover that is disposed on an upper end of the inner plug main body and serves to close an upper opening section thereof; and a control switch that is provided on the cover and is capable of being slid back and forth such that the valve body can be opened and closed. Further, while a first engagement portion is provided on either one of the inner plug main body and the cover, a first engageable portion engageable with the first engagement portion is provided on the other. Here, an elastic section is provided on the upper end of the inner plug main body. Particularly, while a second engagement portion is provided on either one of the elastic section of the inner plug main body and the cover, a second engageable portion engageable with the second engagement portion is provided on the other. This inner plug structure is simpler than a conventional structure where coupling portions are provided on whole circumferences of the inner plug main body and the cover. Moreover, since a force used to slide the control switch is applied in a horizontal direction, i.e., a direction other than a disengagement direction, the inner plug structure shall not be disassembled involuntarily.

SUMMARY OF THE INVENTION

As described above, as for the disassemblable structure of the plug main body and the valve body in the field of a disassemblable plug for use in a fluid container, a certain structure is known that an elastic or spring member is disposed between a valve main body and a valve body cover such that an upper portion of the valve body is a shaft and the valve body cover is taken from or put on the valve body by pushing and rotating the valve body cover at the same time.

However, such disassemblable structure results in such a troublesome procedure that a user has to rotate the valve body cover while holding one hand against it at the same time as holding the other hand against the valve body.

Further, as illustrated in FIG. 26, there is known another structure such that a valve body 101 and a valve shaft 102 are composed of separate components from each other, and between the valve body 101 and an engagement plate 103 provided on the valve shaft 102, a resilient member 104 is provided, and thus, when an inner pressure of a container becomes high such as when pouring hot water into a container main body, the valve shaft 102 can be pushed downward alone in order to release the inner pressure. However, if a metal spring is used as the resilient member 104, such structure undesirably allows the metal spring to be contacted by a content fluid, because the metal spring faces the fluid passage.

The present invention has been made to solve the aforementioned problems. That is, it is an object of the present invention to provide a plug for use in a beverage container that can be easily disassembled into a plug main body and a valve body without allowing a valve body cover to come off the valve body unintentionally. It is also an object of the present invention to provide a plug for use in a beverage container that can ensure the pouring of a content fluid, can enhance its sanitary quality by improving its washing/cleaning processes such that the resilient member is reduced from the valve body and the valve body itself is also made disassemble, and can save its cost by reducing the number of components.

A first aspect of the present invention is to provide a plug for use in a beverage container having a container main body. This plug, includes: a plug main body detachably attached to an opening section of the container main body; a fluid passage formed inside the plug main body, and extending from an inlet open toward an inner side of the container main body to an outlet: open toward an outer side of the plug main body; a valve body biased in a direction allowing the inlet of the fluid passage to be closed: a cover that is provided on an upper end of the plug main body and serves to cover an upper opening section of the plug main both an opening and closing device provided, on the cover; a resilient member that is provided on the valve body and serves to bias the valve body in a closing direction; a valve body cover attached to the valve body in order to prevent the resilient member from coming off; a rotation member rotatably provided on the valve body cover; at least two claw portions that are provided on the rotation member and serve to allow the valve body cover to be engaged with a valve shaft of the valve body; and claw guiding grooves and steps that are provided on an upper portion of the valve body, the number of the claw guiding grooves being equal to the number of or the integral multiple of the claw portions, the steps allowing the rotation member to rotate. As a result, the valve body cover is made detachable by moving the valve body cover up and down.

According to a plug for use in a beverage container as set forth in a second aspect of the present invention, when the valve body cover is attached to the valve body, an upper end of the valve body is protruded from an upper portion of the valve body cover, thereby allowing the valve body cover not to abut against the opening and closing device.

According to a plug for use in a beverage container as set forth in a third aspect of the present invention, the valve body is a separate component from the valve shaft such that the valve shaft is provided with the valve body which closes the inlet of the fluid passage above the valve body.

According to a plug for use in a beverage container as set forth in a fourth aspect of the present invention, the valve body is a separate component from the valve shall and, there is provided an engagement plate that abuts against the valve body and pushes down the valve body when pushing down the valve shaft.

According to the invention of the first aspect, holding the valve body cover and moving it up and down causes the rotation member to be rotated by the steps and the claw portions, thereby detaching the valve body cover from the valve body, thus allowing the valve body of the plug main body to be disassembled.

According to the invention of the second aspect, the upper end of the valve body protrudes from the valve body cover, so that no matter whether the valve body is opened or not, the valve body cover is prevented from being unintentionally disengaged from the valve body due to the opening and closing device not contacting the valve body cover.

According to the invention of the third aspect, the valve body and the valve shall are separate from each other, and the valve shaft is provided with the valve body which closes the inlet of the fluid passage above the valve body. Thus, the diameter of the valve shaft is formed smaller than that of the valve body. For these reasons, even when the inner pressure of the container main body is high due to hot water or the like, this inner pressure can be released by first pushing a valve body of the valve shaft downward. That is, there can be avoided such a situation that the valve body becomes unable to be pushed downward due to the inner pressure, and the content fluid can thus be reliably discharged.

According to the invention of the fourth aspect, the resilient member can be replaced by the engagement plate. That is, a metal coil spring that was conventionally provided in the fluid passage, for example, is no longer required, thereby making the plug sanitary, and saving the cost thereof by decreasing the number of components thereof at the same time.

BRIEF DESCRIPTION OF THE DRAWINGS

FIG. 25 is a cross-sectional view of the plug showing a second embodiment of the present invention.

FIG. 26 is a cross-sectional view of a main section of a conventional valve body.

DETAILED DESCRIPTION OF THE INVENTION

Figure 1:
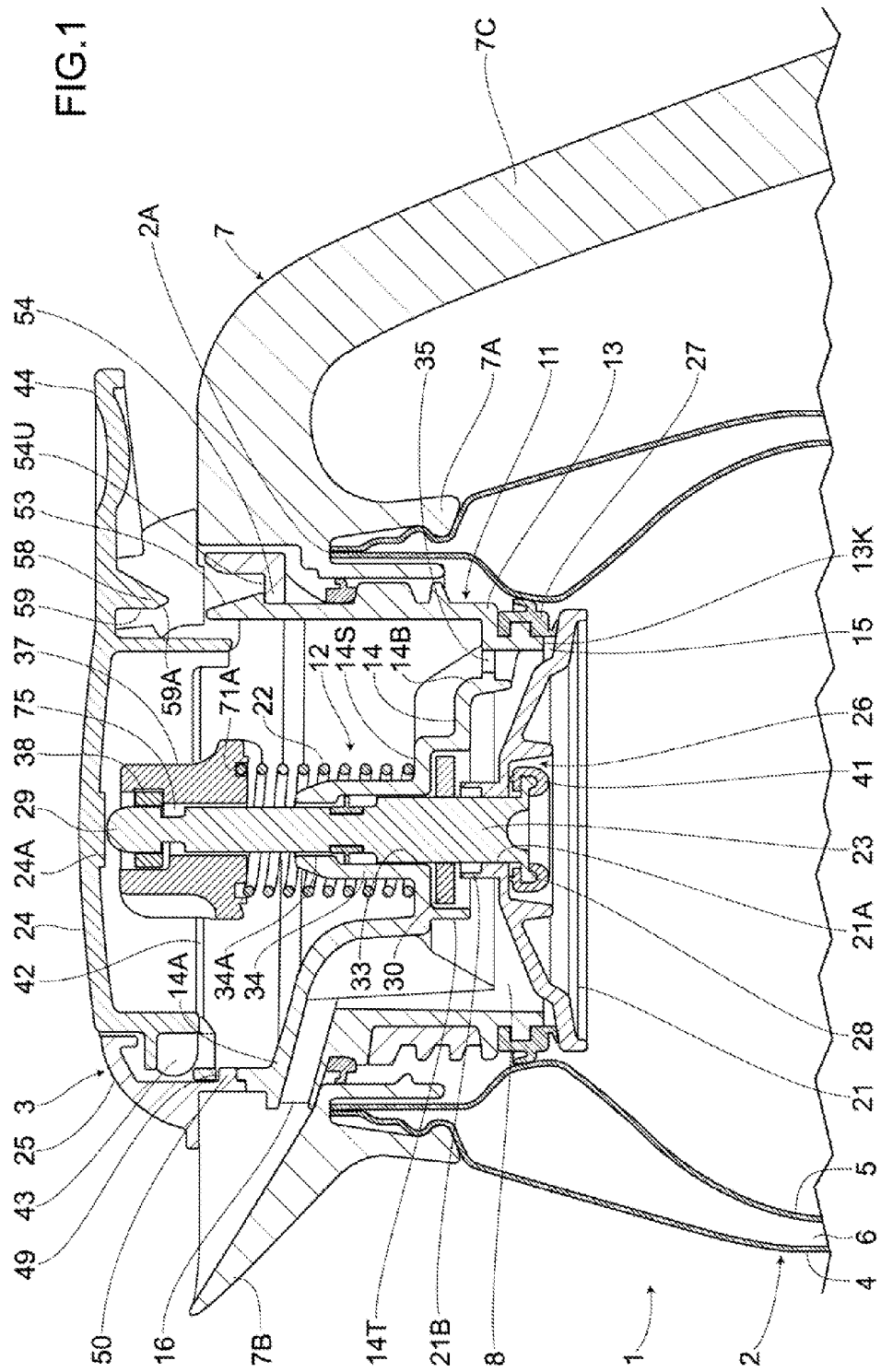
FIG. 1 is an overall cross sectional view showing a first embodiment of the present invention.

Preferred embodiments of the present invention are described in detail hereunder with reference to the accompanying drawings. However, the embodiments described hereunder shall not limit the contents of the present invention that are described in the scope of claims. Further, not all the elements described hereunder are essential elements of the present invention. In fact, unconventional plugs are proposed in the following embodiments, and the following description is give on such plugs.

First Embodiment

FIG. 1 through FIG. 23 show a first embodiment of the present invention. A beverage container 1 which is a thermos bottle, includes: a container main body 2; and a plug 3 that can be detachably attached to an upper opening section 2A of the container main body 2. The container main body 2 includes: an inner container 5; an outer container 4; and a heat-insulating layer (provided between such inner container 5 and outer container 4. Particularly, each of the inner container 5 and the outer container 4 is made of stainless steel and has an opened upper portion. More particularly, upper ends of the inner container 5 and the outer container 4 are integrally joined to each other with a shoulder member 7 being further integrally disposed on an upper portion formed b such inner container 5 and outer container 4. Here, the shoulder member 7 is made of a synthetic resin and is vertically disposed on an opened section formed by the inner container 5 and the outer container 4 that are joined to each other. The shoulder member 7 includes: an annular engagement portion 7A engageable with the aforementioned opened section; a beaked spout portion 7B protruding from one side of the annular engagement portion 7A; and a grip 7C protruding from a location that is opposite to where the spout portion 7B is provided. The aforementioned plug 3 that is also made of a synthetic resin can be detachably attached to the annular engagement portion 7A.

The plug 3 includes: a fluid passage 8 allowing a content fluid to be poured through the spout portion 7B when tilting the beverage container 1 toward a direction along which the spout portion 713 is provided; a plug main body 11 that can be screwed to the shoulder member 7; and a valve structure 12 capable of opening and sealing the fluid passage 8.

The plug main body 11 includes a cylindrical body 13 that can be screwed to the shoulder member 7. Further, provided inside the cylindrical body 13 is a wall-shaped inner divider 14 whose height is formed lower from one side to the other. Here, the aforementioned fluid passage 8 is formed below and along the inner divider 14. The fluid passage 8 is so formed that it continuously connects an inlet 15 serving as a lower opening section of the cylindrical body 13 to an outlet 16 opened on an upper section of the other side. The inner divider 14 includes: a second-side region 14B connected to where the inlet 15 is formed; and a first-side region 14A connected to an upper side surface of the cylindrical body 13. Particularly, the outlet 16 is formed below where the first-side region 14A is connected to the upper side surface of the cylindrical body 13.

Further, the plug 3 includes: a resilient member 22 such as a coil spring for constantly lifting a valve body 21 of the valve structure 12 upward such that the inlet 15 can be sealed by the valve body 21; a control lever 24 for pushing a valve shaft 23 of the valve body 21 downward; and a cover 25 covering an upper portion of the plug main body 11. The valve body 21 serves to seal a lower end portion 13K of the cylindrical body 13 in a watertight manner, thus allowing the inlet 15 to he sealed.

Here, the means for pushing down the valve shaft 23 of the valve body 21 may be, but not limited to anything other than the control lever, such as a sliding member, a button or the like.

The aforementioned valve structure 12 includes: the valve body 21; the valve shaft 23 extended upward from a central region of the valve body 21; and a pressure reducing unit 26 formed between the valve shaft 23 and the valve body 21. The valve body 21 is formed into the shape of a disk having a diameter slightly larger than that of the lower end portion 13K. Particularly, the valve body 21 serves to seal the inlet 15 by abutting against a water-stop packing 27 attached to the lower end portion 13K. Further, bored in the central region of the valve body 21 is an attachment hole 21A used to attach the valve shaft 23.

The valve shaft 23 integrally includes: a disk portion 28 that is formed on a lower end thereof and has a diameter larger than that of the attachment hole 21A; and a shaft portion 29 extended upward. Further, an engagement plate 30 is detachably attached to a lower region of the shaft portion 29, the engagement plate 30 being made of a synthetic resin and serving as an engagement member.

Figure 11A:
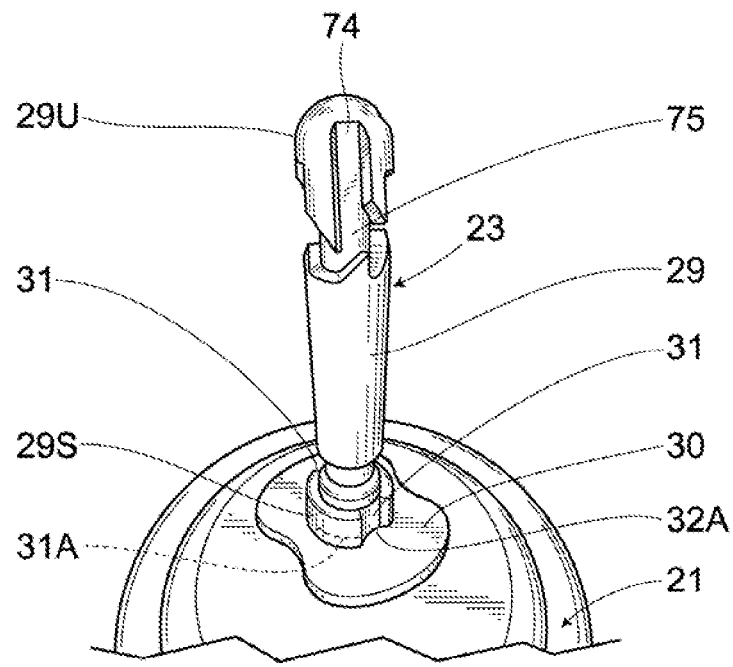
FIG. 11A is a perspective view showing a state of a valve shaft of the first embodiment in which engageable sections of an engagement plate are positioned to vertical grooves of a valve shaft.
Figure 11B:
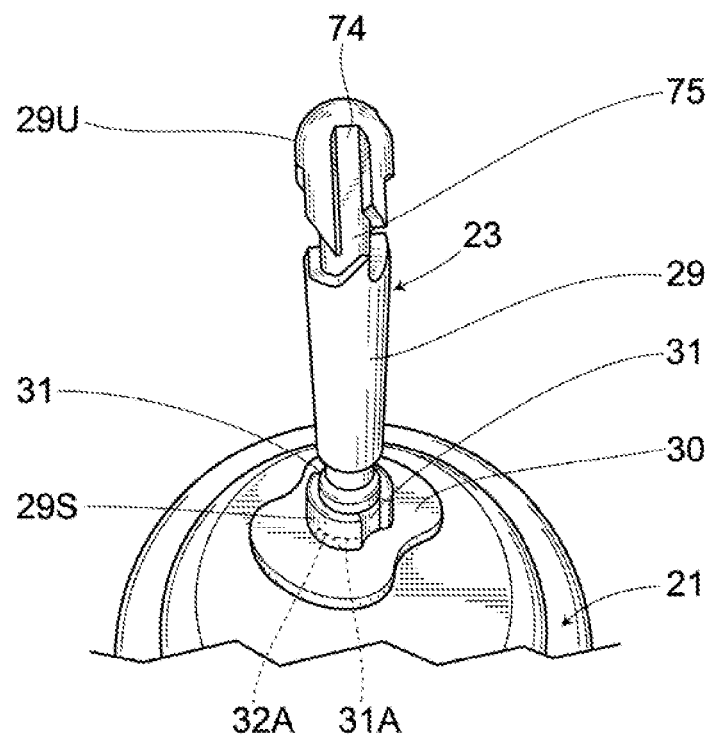
FIG. 11B is a perspective view showing a state of the valve shaft of the first embodiment in which the engagement plate has been positioned in an axial direction after being rotated by about 90 degrees.

Particularly, a lower section 298 of the shaft portion 29 has a diameter huger than that of an upper section 29U of the shall portion 29. Further, provided on an outer circumference of the lower section 29S are vertical grooves 31, 31 that are positioned opposite to each other. These vertical grooves 31, 31 are formed luau axial direction, and a distance between bottom sections of these vertical grooves 31, 31 substantially corresponds to the diameter of the upper section 29U. Meanwhile, the aforementioned engagement plate 30 is substantially formed into an oval shape and has to through hole 32 formed in a center thereof. This through hole 32 has engageable sections 32A, 32A capable of engaging with the vertical grooves 31, 31, thus allowing the lower section 29S to be inserted, through the through hole 32. Further, engagement grooves 31A, 31A are circumferentially provided next to the vertical grooves 31, 31 in a manner such that each engagement groove 31A is formed at an angle of about 90 degrees with respect to adjacent vertical grooves 31, 31. As shown in FIG. 11A, the engagement plate 30 is to be disposed on the lower section 29S of the shaft portion 29 by engaging the engageable sections 32A, 32A with the vertical grooves 31, 31. Next, the engagement plate 30 thus disposed is to be rotated by about 90 degrees in a planar view. Here, as shown in FIG. 11B, each engageable section 32A can thereby engage with each engagement groove 31A, thus allowing the engagement plate 30 to be attached to the valve shall 23 with the engagement plate 30 itself being positioned in a longitudinal direction of the shaft portion 29. The engagement plate 30 thus attached can likewise be removed through a reverse procedure.

Figure 12:
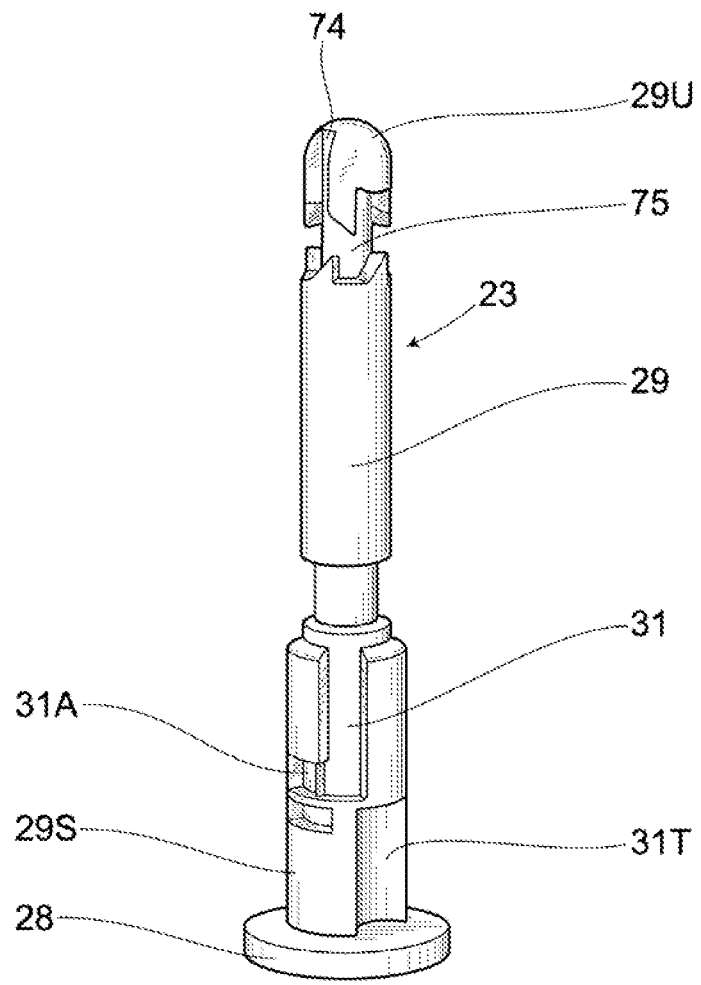
FIG. 12 is a perspective view showing the valve shaft of the first embodiment.
Figure 13:
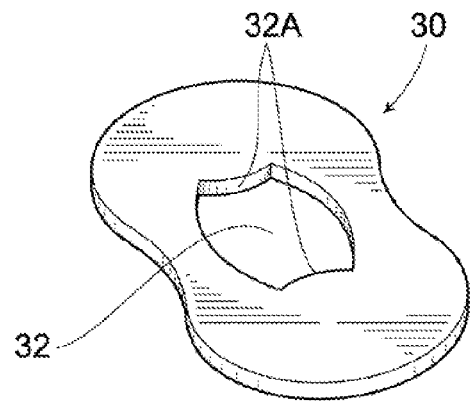
FIG. 13 is a perspective view showing the engagement plate of the first embodiment.
Figure 14:
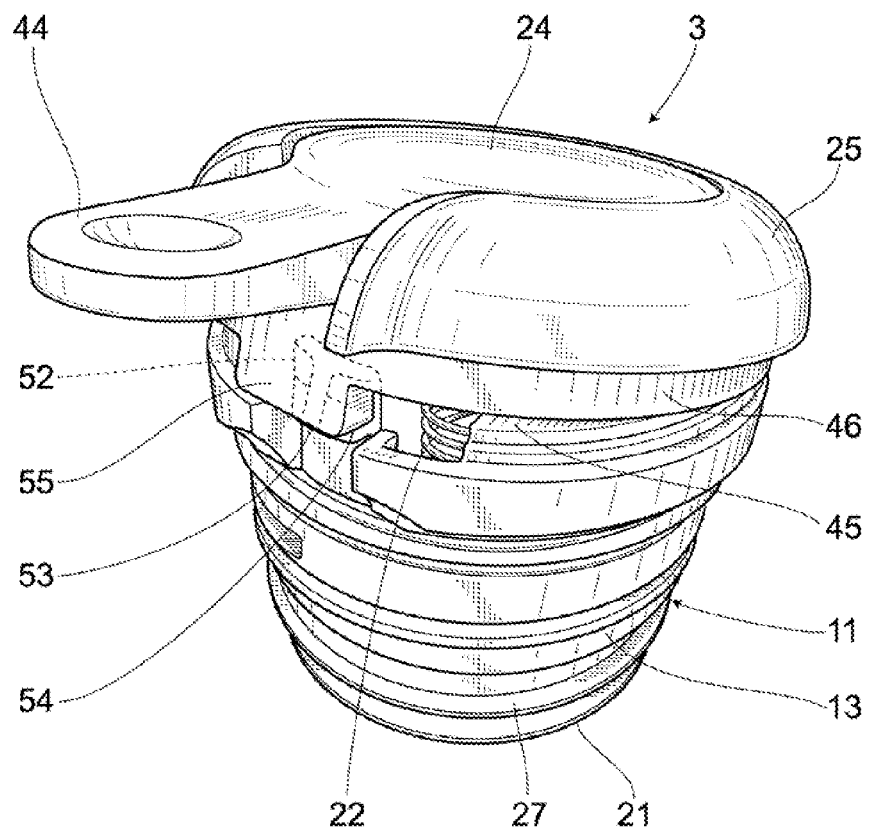
FIG. 14 is a perspective view showing a state of the plug of the first embodiment in which the second engagement portion and the second engageable portion have been disengaged from each other.
Figure 15:
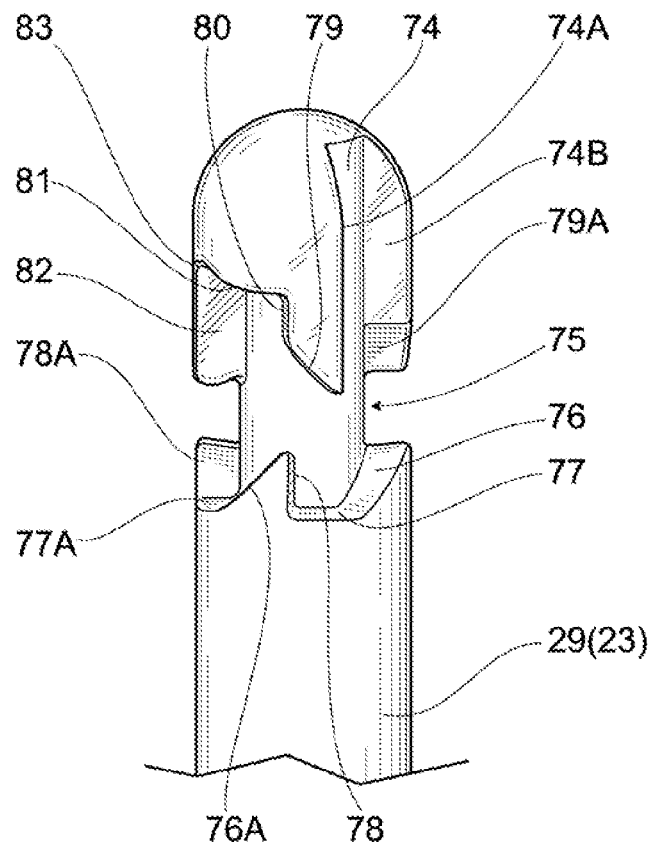
FIG. 15 is a perspective view showing an upper end side of the valve shaft of the first embodiment.
Figure 16:
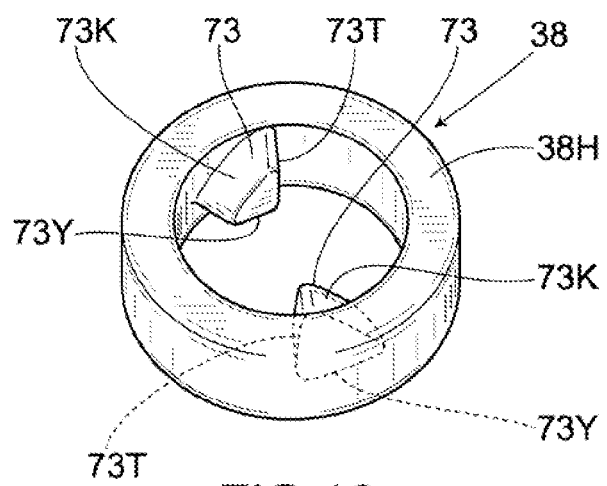
FIG. 16 is a perspective view showing a rotation member of the first embodiment.

Further, as shown in FIG. 12, also provided on the lower section 29S of the shaft portion 29 are ventilation grooves 31T, 31T. Particularly, these ventilation grooves 31T, 31T are formed on an outer circumferential section of the lower section 29S that is below the engagement grooves 31A, 31A. More particularly, these ventilation grooves 31T, 31T are vertical and are provided opposite to each other. The lower section 29S having such ventilation grooves 31T, 31T is to be inserted through the aforementioned attachment hole 21A.

As for the aforementioned inner divider 14, formed on a central portion 14S thereof is a through hole 33 allowing the shaft portion 29 of the valve shaft 23 to he inserted therethrough. Further, provided on an upper circumference of such through hole 33 is a guiding cylinder 34 that is intended liar the shall portion 29. Furthermore, the inner divider 14 includes an air hole 35 that is formed on the other side, i.e., opposite to the outlet 16 in a radial direction.

The aforementioned resilient member 22 is fitted onto the guiding cylinder 34. This resilient member 22 is compressed between: an upper surface of the central portion 14S of the inner divider 14; and a valve body cover 37 that is detachably provided on an upper portion of the valve shaft 23 protruding from the guiding cylinder 34. The resilient member 22 serves to constantly lift the valve body 21 upward.

The valve body cover 37 serves to hold an upper portion of the resilient member 22. Particularly, the valve body cover 37 includes a rotation member 38 that can, in a vertical direction, be detachably connected to the upper section of the shaft portion 29 of the valve shaft 23. This rotation member 38 is rotatable fitted inside the valve body cover 37 and can be detachably attached to the upper portion of the valve shaft 23.

The engagement plate 30 rises and falls along with the valve shaft 23. Further, an undersurface of the engagement plate 30 is allowed to abut against an upper end of a cylindrical receiving portion 218 protruding, upward from the attachment hole 21A. Furthermore, provided on an undersurface of the central portion 14S is a cylindrical portion 14T protruding therefrom, the cylindrical portion 14T being capable of receiving the engagement plate 30.

Here, a pressure reducing packing 41 is attached to an outer circumference of the aforementioned disk portion 28.

The shaft portion 29 of the valve shaft 23 is to be inserted through the attachment hole 21A, and the resilient member 22 is compressed between the valve body cover 37 and the upper surface of the central portion 14S. Therefore, an undersurface of the valve body 21 and the pressure reducing packing 41 can tightly abut against each other, thus allowing the valve shaft 23 and the valve body 21 to he connected to each other as a whole. In fact, the aforementioned a pressure reducing unit 26 includes: the attachment hole 21A of the valve body 21; the disk portion 28 of the valve shaft 23; the pressure reducing packing 41; the resilient member 22; and the engagement plate 30.

The attachment hole 21A of the valve body 21 has a diameter larger than that of the shaft portion 29 of the valve shaft 23. Here, the valve structure 12 is to be installed in the plug main body 11 as follows. That is, the upper section 29U of the shaft portion 20 protruding upward from the valve body 21, is to be inserted through the guiding cylinder 34 along a small-diameter inner circumferential surface 34A that is located on an upper portion of the guiding cylinder 34. Next, the engagement plate 30 is to be received in the cylindrical portion 14T, and the valve body cover 37 is to be engaged with the upper section 29U of the shaft portion 29 with the resilient member 22 being fitted onto the guiding cylinder 34.

Figure 3:
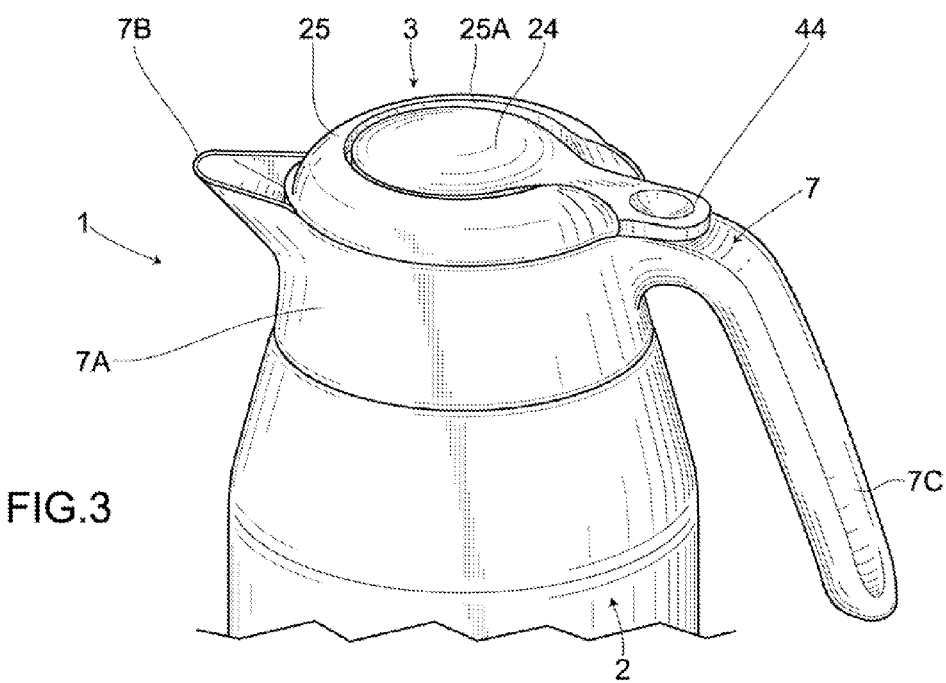
FIG. 3 is a perspective view showing a beverage container of the first embodiment.

The aforementioned cover 25 serves to cover an upper opening section 42 of the cylindrical body 13 of the pine main body 11. Particularly, the cover 25 is detachably provided on the upper opening section 42 in a manner such that the cover 25 is actually engageable with the cylindrical body 13. As shown in FIG. 3, provided on a central region of the cover 25 is an opening section 25A formed as a cutout. As for such cutout, opened is a portion of the cover 25 that is arranged on the other side of the shoulder member 7. Further, disposed on the opening section 25A is the aforementioned control lever 24 whose one end is pivotally attached to the cover 25 through a pivot point 43 such that the control lever 24 can be titled with respect to the cover 25. Here, a control portion 44 of the control lever 24 protrudes outward from the other side Of the cover 25 and is thus positioned above the shoulder member 7. Moreover, a convex portion 24A is provided, on a region of an undersurface of the control lever 24 that allows an upper end of the valve shaft 23 to abut thereagainst, the convex portion 24A having a flat undersurface.

Figure 5:
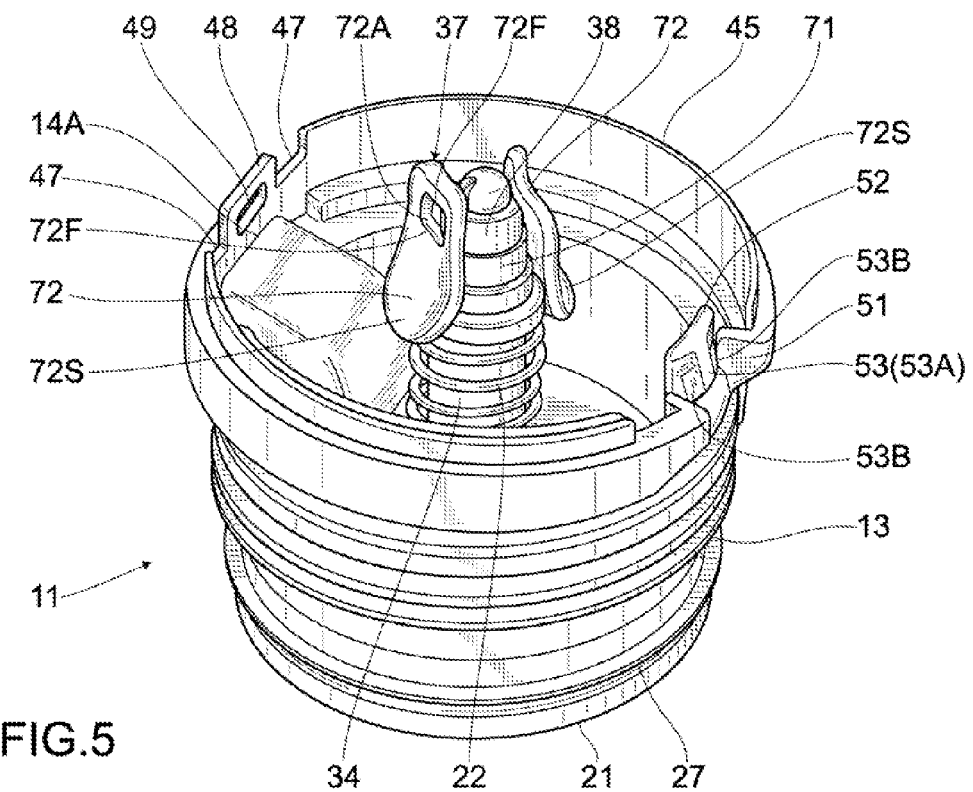
FIG. 5 is a first perspective view showing a plug main body of the first embodiment.

As for the upper portion of the plug main body 11 shown in FIG. 5, for example, an upper cylindrical portion 4 is provided on an upper portion of the cylindrical body 13. Further, as shown in FIG. 6, for example, formed on an undersurface of the cover 2 is a lower cylindrical portion 46 that is to be fitted onto the upper cylindrical portion 45.

Figure 9:
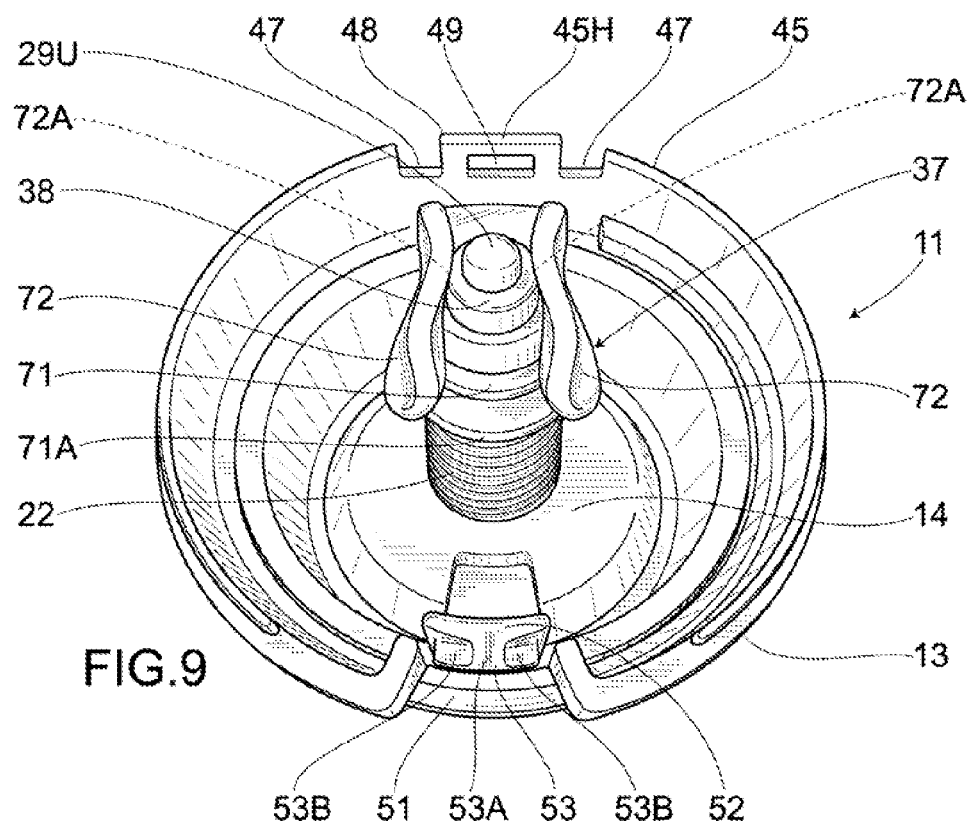
FIG. 9 is a second perspective view showing the plug main body of the first embodiment.
Figure 10:
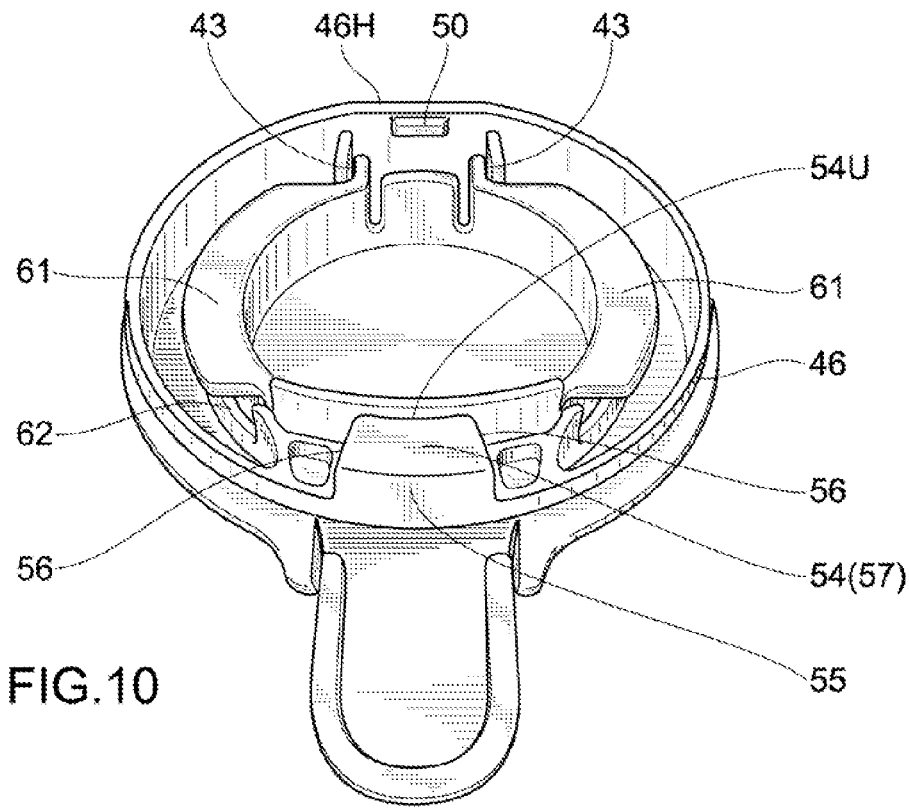
FIG. 10 is a second perspective view showing the control lever of the first embodiment.

As shown in FIG. 5 and FIG. 9, a horizontal planar section 45H is provided on one side of the upper cylindrical portion 45. Further, cutout grooves 47, 47 whose upper portions are opened are respectively and symmetrically formed on a left and right sides of the planar section 45. Here, provided between the cutout grooves 47, 47 is a protrusion section 48 having a transverse hole 49 as a first engagement portion bored therein. As shown in FIG. 6 and FIG. 10, a horizontal planar section 46H is provided on one side of the lower cylindrical portion 46. Particularly, formed on an inner surface of the planar section 46H is a transverse protruding portion 50 as a first engageable potion that is engageable with the transverse hole 49. In this case, the transverse hole 49 is formed on the protrusion section 48 having only a lower portion thereof fixed to the cylindrical body 13, thereby allowing the protruding portion 50 to engage with the transverse hole 49 in a stepwise manner.

Meanwhile, as shown in FIG. 5 and FIG. 9, provided on an upper portion of the other side of the cylindrical body 13 is a concave area 51 that is recessed toward an inner side of the cylindrical body 13. An elastic section 52 protruding upward is formed on a bottom section of the concave area 51. In fact, this elastic section 52 is connected to the cylindrical body 13 only through a lower end thereof, and an upper end of such elastic section 52 is formed as a free end. Further, formed on an outer surface of the elastic section 52 is an engagement claw section 53 serving as a second engagement portion. This engagement claw section 53 includes: a horizontal engagement surface 53M; a central slanted surface 53A extending from a center of the engagement surface 53M to the upper end of the elastic section 52, and side slanted surfaces 53B, 53B that are formed on both sides of and lower than the central slanted surface 53A. That is, the concave area 51 that is recessed inward is provided on the cylindrical body 13, and the elastic section 52 is further disposed inside the concave area 51. Therefore, the elastic section 52 is allowed to be arranged inside an outer diameter of the plug main body 11.

Figure 6:
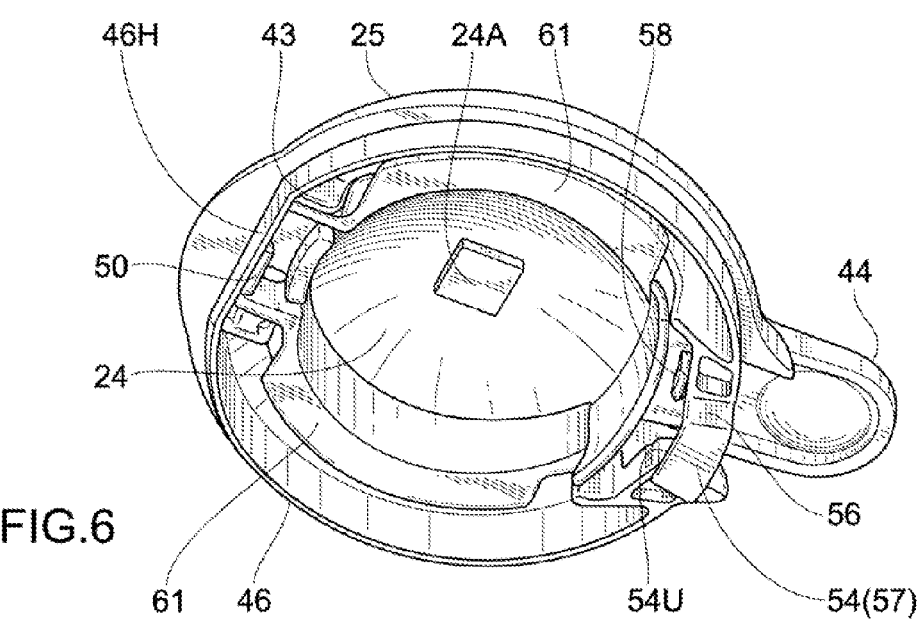
FIG. 6 is a first perspective view showing the control lever of the first embodiment.
Figure 7:
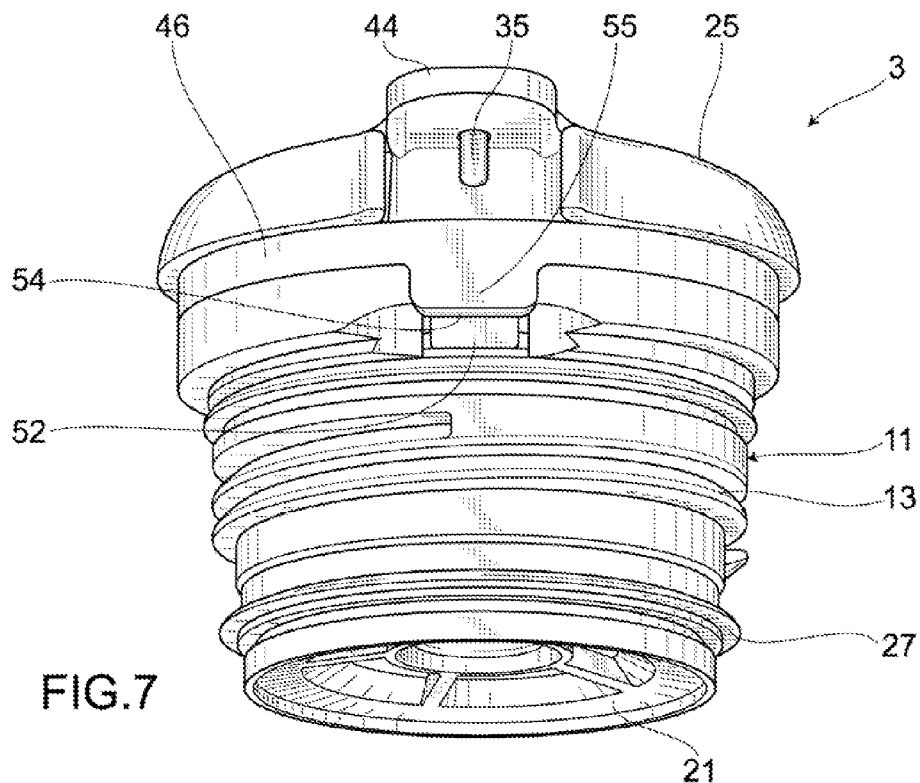
FIG. 7 is a perspective view showing the plug of the first embodiment.
Figure 8:
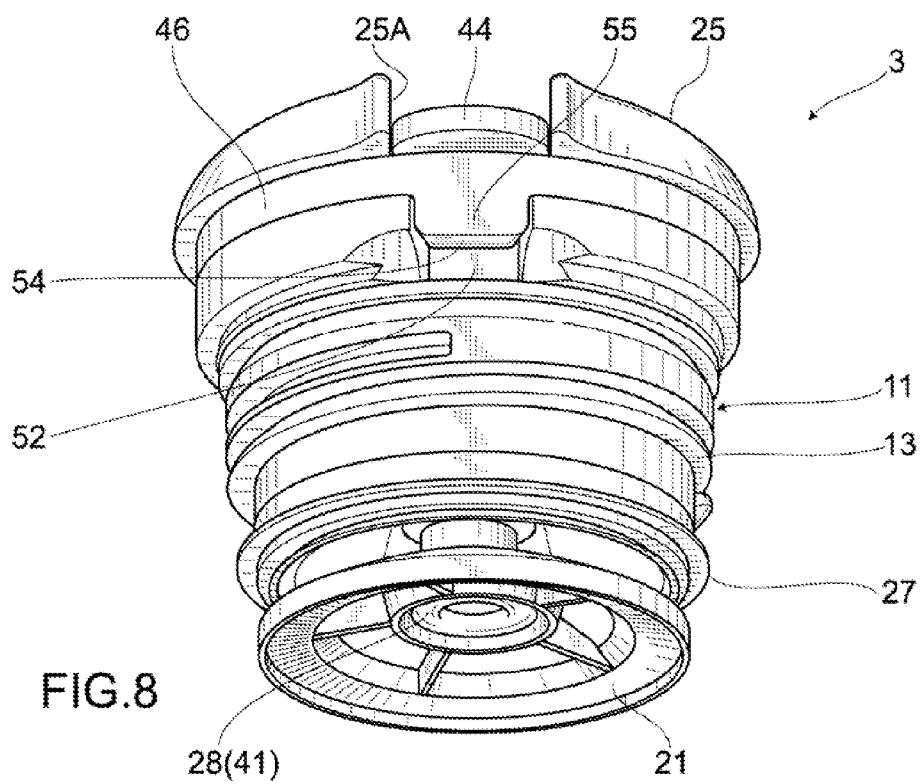
FIG. 8 is a perspective view showing a state of the plug of the first embodiment in which the control lever has been pushed downward.

As shown in FIG. 6, for example, located on the other side of the lower cylindrical portion 46 is a transverse-plate upper surface 54U of a transverse plate section 54, the transverse-plate upper surface MU serving as a second engageable portion. The transverse plate section 54 and a lower end of the lower cylindrical portion 46 are connected to each other through an extended portion 55 extended from the corresponding lower cylindrical portion 46. Further, a left and right sides of the transverse plate section 54 are connected to the cover 25 through joining sections 56, 56, the transverse plate section 54 having a flat undersurface.

Provided on the undersurface of the control lever 24 is a protrusion section 58 protruding downward. Particularly, while one side of the protrusion section 58 has a vertical edge portion 59, the other side thereof is formed as slanted edge. That is, the protrusion section 58 is substantially formed into the shape of a triangle in a lateral view. Here, the vertical edge portion 59 is provided with an abutment edge section 59A formed on a lower portion thereof and slanting from top down to the other side. Further, the abutment edge section 59A is arranged in a location allowing, the protrusion section 58 to abut against the elastic section 52 when manipulating the control lever 24.

When rotating the control lever 24 downward, the abutment edge section SPA shall abut against the central slanted surface 53A, thereby pushing the elastic section 52 in a disengagement direction thereof such that the corresponding elastic section 52 can be disengaged from the transverse-plate upper surface 54U.

Figure 2:
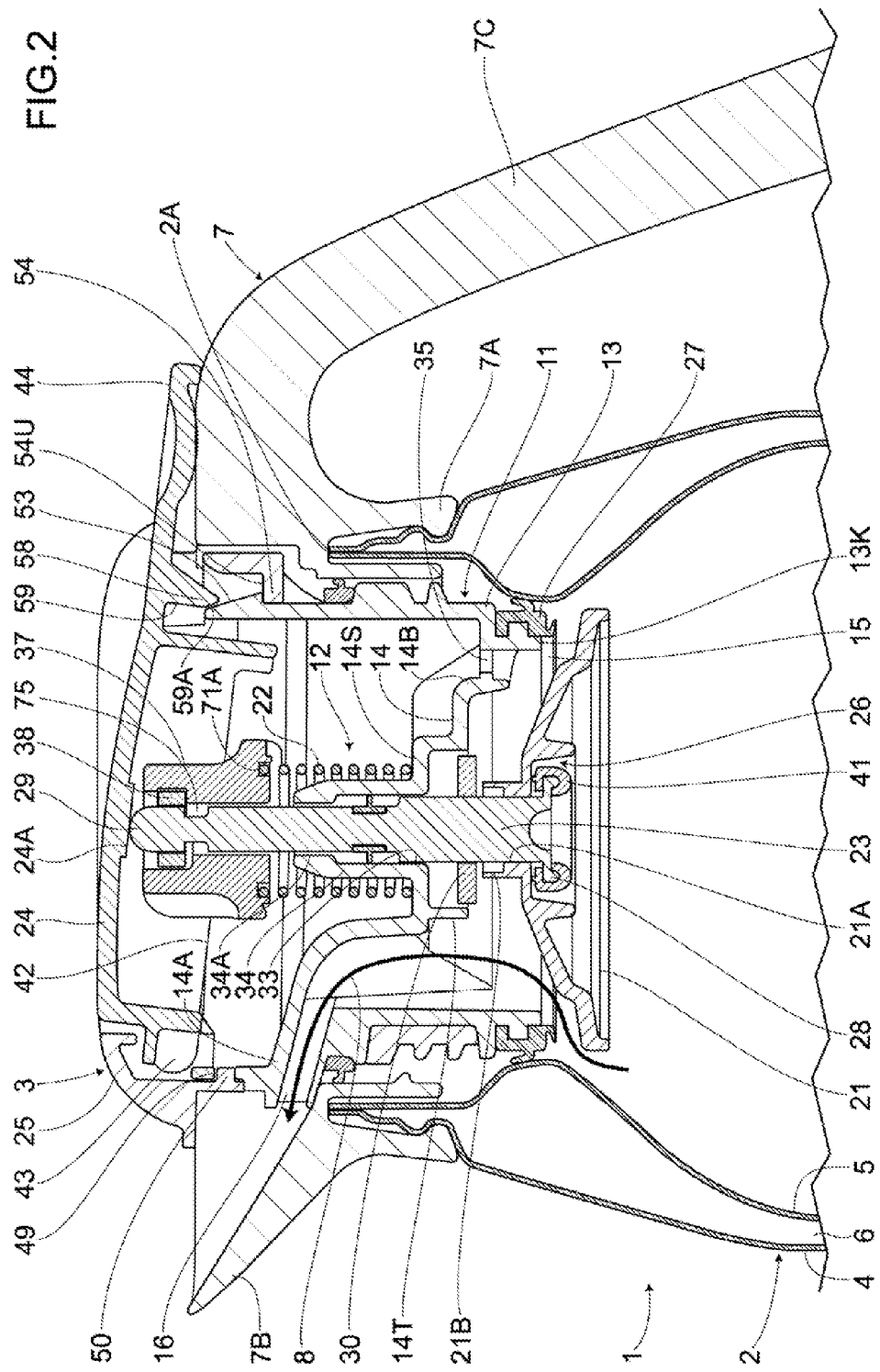
FIG. 2 is an overall cross-sectional view showing a state of the first embodiment in which a control lever is abutting against a shoulder member.

As shown in FIG. 2, with the plug 3 being attached to the container main body 2, a lower section of the control portion 44 shall abut against an upper surface of the shoulder member 7 serving as a rotation restriction member, as a result of pushing the corresponding control portion 44 of the control lever 24 downward. Here, a rotation range of the control lever 24 is thus restricted, thereby preventing the aforementioned protrusion section 58 from abutting against the elastic section 52.

Further, as shown in FIG. 10, for example, flange portions 61, 61 serving as positioning portions are provided on a left and right sides of an under portion of the control lever 24. Furthermore, provided on the aforementioned cover 25 is an abutment segment 62 allowing the flange portions 61, 61 to abut thereagainst. Here, upper surfaces of the cover 25 and the control lever 24 shall be substantially flush with each other as a result of allowing the flange, portions 61, 61 to abut against the abutment segment 62.

The aforementioned valve body cover 37 includes: a cylindrical portion 71 allowing the shaft portion 29 of the valve shall 23 to be loosely inserted therethrough; a holder 71A that is provided on a lower portion of the cylindrical portion 71 and serves to hold the upper portion of the resilient member 22; finger grips 72, 72 provided on a left and right sides of the cylindrical portion 71; and engagement opening sections 72A. 72A that are respectively provided on the left and right finger grips 72, 72 and allow the aforementioned rotation member 38 to rotatably engage therewith. Here, the rotation member 38 is rotatably attached to the engagement opening sections 72A, 72A by being engaged therewith. Each engagement opening section 72A is substantially formed into the shape of a rectangle, and has an upper and lower edges 72F, 72F that serve to sandwich an upper and under surfaces of the rotation member 38. Particularly, these upper and lower edges 72F, 72F are arranged parallel to each other in a substantially parallel direction. As for each finger grip 72, a lower portion 72S thereof is widened outward such that it becomes easier to push the valve body cover 37 downward by holding the left and right finger grips 72, 72. Further, the rotation member 38 is arranged upon an upper portion of the cylindrical portion 71. That is, with the shaft portion 29 being inserted through the rotation member 38 and the cylindrical portion 71, a left and right sides of the corresponding rotation member 38 are engaged with the engagement opening sections 72A, 72A, thereby allowing this rotation member 38 to be rotatably attached to the valve body cover 37 and move up and down along with the valve body cover 37 in the axial direction.

As for the rotation member 38, provided on an inner surface of a cylindrical main body 38 H are bulging engagement claw portions 73 serving as engagement portions. Particularly, these engagement claw portions 73 are formed in two locations that are opposite to each other. More particularly, each engagement claw portion 73 includes: as vertical edge section 73T extending in the axial direction of the shall portion 29; a transverse edge section 73Y that is formed on a lower end of the vertical edge section 73T and is thus extended from one end to other end in a direction orthogonal to that of the vertical edge section 73T; and a slanted edge section 73K formed between an upper end of the vertical edge section 73T and other end of the transverse edge section 73Y.

Meanwhile, provided on an upper end section of the shaft portion 29 of the valve shaft 23 are claw guiding grooves 74, 74 that are formed in the axial direction and correspond to the aforementioned engagement claw portions 73, 73. Further, provided below adjacent claw guiding grooves 74, 74 is a circumferentially recessed groove 75 allowing the engagement claw portions 73, 73 to engage therewith and the rotation member 38 to rotate therearound. As for each claw guiding groove 74, an upper end thereof located at the upper end section of the shaft portion 29 is opened, thereby allowing each engagement claw portion 73 to be inserted into the corresponding claw guiding groove 74 from the axial direction. Also, with regard to each claw guiding groove 74, a distance between a first side surface 74A and a second side surface 74B is formed slightly wider than each transverse edge section 73Y. That is, such first side surface 74A and second side surface 74B are respectively formed on a first side and a second side of the shaft portion 29 in a circumferential direction. In fact, the number of the claw guiding grooves 74 provided may be as same as or an integral multiple of the number of the engagement claw portions 73 provided.

Described hereunder is a structure of the recessed move 75. In the following description, a front end section of the shaft portion 29 is referred to as an upper region, whereas a base end section thereof is referred to as a lower region. The recessed groove 75 includes a first lower slanted surface 76 that: is formed below one of the claw guiding grooves 74 provided as a pair, and allows one of the engagement claw portions 73 to move toward the first side in the circumferential direction. Particularly, a first side of the first lower slanted surface 76 is formed lower than a second side thereof. More particularly, such first side and second side of the first lower slanted surface 76 are substantially arranged in lower sections of virtual extended lines extending from the first side surface 74A and the second side surface 74B. Further, provided next to the first side (lower end) of the first lower slanted surface 76 is a horizontal first bottom surface 77 allowing one of the transverse edge sections 73Y to engage therewith. Furthermore, disposed on a first side of the first bottom surface 77 is a first upper guiding surface 78 that is formed along the axial direction and extended upward. Furthermore, formed above the first bottom surface 77 is a first upper slanted surface 79 allowing one of the slanted edge sections 73K to abut thereagainst and one of the engagement claw portions 73 to thus move to the first side in the circumferential direction. Here, a first side of the first upper slanted surface 79 is formed higher than as second side thereof. Such first side and second side of the first upper slanted surface 79 are substantially arranged in upper sections of virtual extended lines extending from the first upper guiding surface 78 and a second side of the first bottom surface 77. Moreover, each slanted edge section 73K and the first upper slanted surface 79 are substantially slanted at a same angle with respect to the axial direction.

Also, with regard to the recessed groove 75, formed on the first side of the first upper slanted surface 79 is a first upper guiding surface 80 extended upward. This first upper guiding surface 80 is substantially arranged on the virtual extended line extending from the first upper guiding surface 78. Provided on a first side of the first upper guiding surface 80 is an intermediate slanted surface 81 slanting upward toward a first side thereof. Further, provided on the first side of the intermediate slanted surface 81 is a lower guiding surface 82 extended downward. Here, formed on a first side of the first upper guiding surface 78 are a second lower slanted surface 76A and a second bottom surface 77A that are continuous with each other and correspond to the intermediate slanted surface 81. Particularly, the second lower slanted surface 76A is slanted downward from an upper end of the first upper guiding surface 78 to the first side in the circumferential direction. More particularly, the lower guiding surface 82 is farmed in a location corresponding to a range that is defined by the second bottom surface 77A. In addition, a second upper guiding surface 78A is provided on a first side of the second bottom surface 77A. The second side surface 74B of the other claw guiding groove 74 is substantially arranged on a virtual extended line extending from the second upper guiding surface 78A. A second upper slanted surface 79A is then located between a lower end of the corresponding second side surface 74B and a lower end of the lower guiding surface 82.

Figure 17:
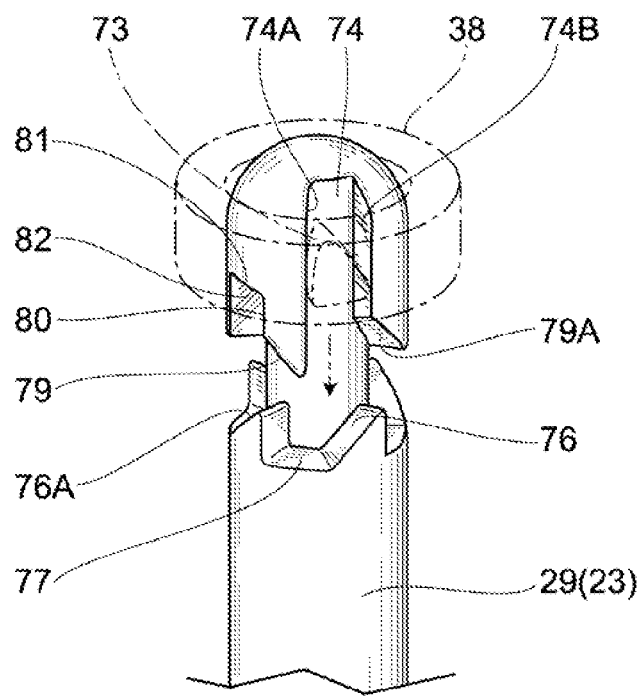
FIG. 17 is a perspective view showing a state of the upper end side of the valve shaft and the rotation member of the first embodiment, in which the rotation member is being pushed downward with engagement claw portions being positioned to claw guiding grooves.
Figure 18:
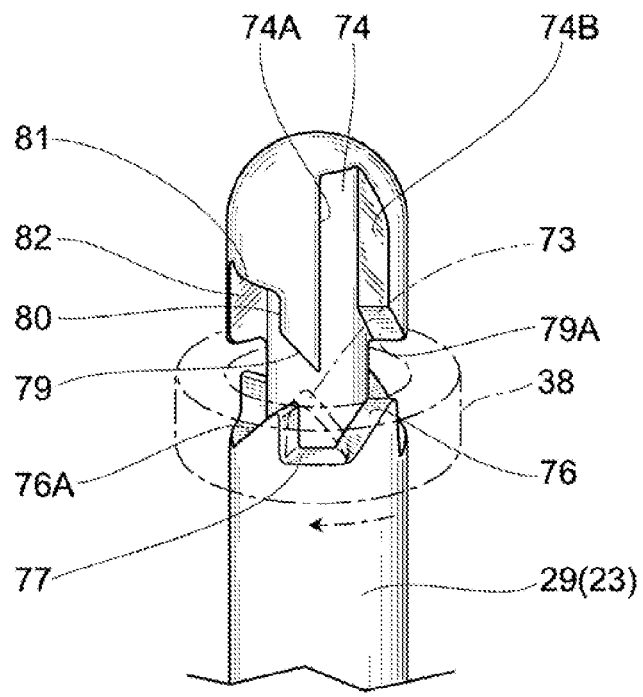
FIG. 18 is a perspective view showing, a state of the upper end side of the valve shall and the rotation member of the first embodiment, in which one of the engagement claw portions has been engaged with a first bottom surface.
Figure 19:
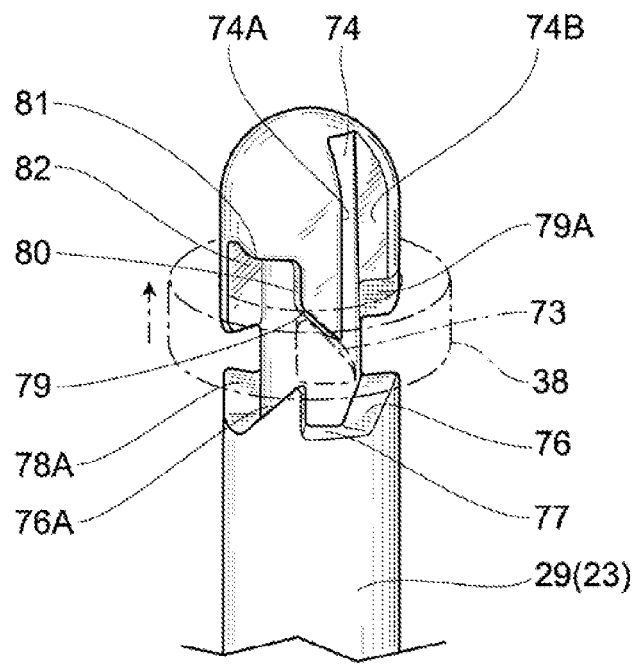
FIG. 19 is a perspective view showing a state of the upper end side of the valve shall and the rotation member of the first embodiment, in which the aforementioned engagement claw portion has been engaged with a first upper slanted surface.
Figure 20:
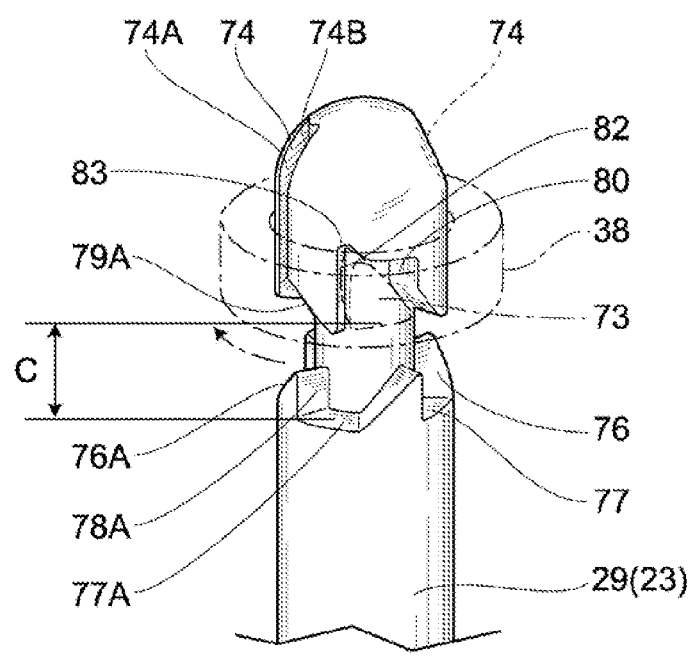
FIG. 20 is a perspective view showing a state of the upper end side of the valve shaft and the rotation member of the first embodiment. in which the aforementioned engagement claw portion has been engaged with a corner section.
Figure 21:
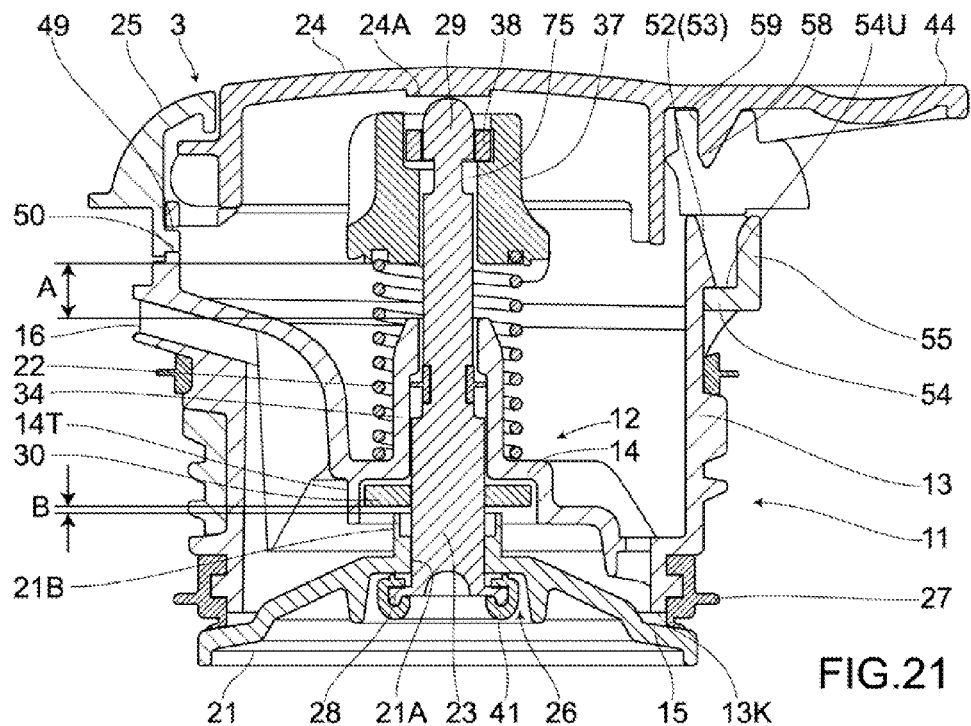
FIG. 21 is a cross-sectional view showing the valve body of the first embodiment.

A method for using the valve body cover 37 is described hereunder with reference to FIG. 17 through FIG. 20 in which the rotation member 38 is indicated by dashed-dotted lines. As shown in FIG. 17, the engagement claw portions 73, 73 are to be positioned to the claw guiding grooves 74, 74, followed by holding the valve body cover 37 and then pushing the same downward against a bias of the resilient member 22. As a result, one of the engagement claw portions 73 is to be guided by the first lower slanted surface 76, as shown in FIG. 18, such that the rotation member 38 can be rotated toward the first side in the circumferential direction, thereby allowing the transverse edge section 73Y of the corresponding engagement claw portion 73 to engage with the first bottom surface 77. Here, by either loosening a force used to push the valve body cover 37 downward or removing a hand, the valve body cover 37 shall rise due to an elastic restoring force of the resilient member 22. As a result, the rotation member 38 is to be rotated to the first side in the circumferential direction such that the slanted edge section 73K of the aforementioned engagement claw portion 73 can abut against the intermediate slanted surface 81. Particularly, the valve body cover 37 stops rising when the corresponding engagement claw portion 73 has engaged with a corner section 83 firmed by the intermediate slanted surface 81 and the lower guiding surface 82. In this way, the valve body cover 37 is allowed to be attached to the shaft portion 29.

In fact, due to the bias of the resilient member 22, the valve body cover 37 shall not be disengaged from the shaft portion 29 unless when being pushed downward. Further, while an upper end of the shaft portion 29 protruding from an upper end of the valve body cover 37 is in contact with the control lever 24, the valve body cover 37 itself is not. Therefore, the valve body cover 37 shall not be subjected to influences resulting from manipulating the control lever 24.

In contrast, the valve body cover 37 is removed as follows. That is, the valve body cover 37 disposed in an attachment location is to be pushed downward, thereby causing the rotation member 38 to rotate toward the first side in the circumferential direction, such that a lower portion of the aforementioned engagement claw portion 73 can engage with the second lower slanted surface 76A and that the corresponding engagement claw portion 73 can then engage with the second bottom surface 77A. Here, by either loosening the force used to push the valve body cover 37 downward or removing the hand, the valve body cover 37 shall rise due to the elastic restoring force of the resilient member 22. As a result, the rotation member 38 is to be rotated to the first side in the circumferential direction such that the slanted edge section 73K of the corresponding engagement claw portion 73 can engage with the second upper slanted surface 79A. In this way, this engagement claw portion 73 can then rise along a neighboring claw guiding groove 74, thus allowing the valve body cover 37 to be removed from the a shaft portion 29.

The present embodiment includes the following structure that allows the valve body cover 37 to be removed from the shaft portion 29 when pushed downward. A stroke A of the valve body cover 37 is a distance between: a lower end of the valve body cover 37 attached to the shaft portion 29; and an upper end of the guiding cylinder 34. Further, a stroke B of the valve body 21 and the engagement plate 30 is a distance between: an upper end of the cylindrical receiving portion 21B of the closed valve body 21; and the undersurface of the engagement plate 30. Furthermore, a stroke C of one of the engagement claw portions 73 in the attachment location is a distance between: the transverse edge section 73Y of this engagement claw portion 73; and the second bottom surface 77A, in the corner section 83.

The distances A, B and C satisfy a formula of A>(B+C). Therefore, when removing the valve body cover 37 from the valve shaft 23, the plug main body 11 and the valve body cover 37 can be prevented from abutting against each other, thus preventing the rotation member 38 from tailing to rotate to a disengagement location.

Described hereunder is a function of the aforementioned structure. When assembling the plug 3, the transverse protruding portion 50 is to be inserted into and engaged with the transverse hole 49 on one side. Next, the other side oldie cover 25 is to be pushed downward, centering around where the transverse protruding portion 50 is engaged with the transverse hole 49. As a result, the transverse plate section 54 shall abut against an outer surface of the engagement claw section 53, thereby causing the elastic section 52 to undergo an elastic deformation inward, thus allowing the transverse plate section 54 to engage with the engagement claw section 53. In this way, the cover 25 is allowed to be fixed to the plug main body 11.

Alternatively, a slanted surface(s) may be provided on a lower portion of the transverse protruding portion 50. In such case, since the protrusion section 4 is also elastic, the cover 25 can be fixed to the plug main body 11 when simply pushed down thereto from above.

Here, the control portion 44 of the control lever 24 can be pushed downward with the plug 3 being screwed together with the container main body 2. At that time, the control lever 24 is allowed to pivot around the pivot point $3 that is provided on one end. Particularly, the convex portion 24A of the control lever 24 pushes the upper end of the valve shall 23 downward as the control lever 24 itself pivots, thus causing both the valve shaft 23 and the valve body 21 to move downward against the bias of the resilient member 22. As a result, the water-stop packing 2 shall move away hum the valve body 21 such that the fluid passage 8 shall be opened. Here, by titling the beverage container 1 toward the direction of the spout portion 7B, the content fluid can be poured out through the fluid, passage 8 and the spout portion 7B. Further, as for the control lever 24, the lower section of the control portion 44 can abut against the upper surface of the shoulder member 7 serving as a rotation restriction member. There, the control lever 24 can be restricted from further rotating with the transverse plate section 54 being engaged with and held by the elastic section 52, thus defining a rotation restriction position.

Figure 22:
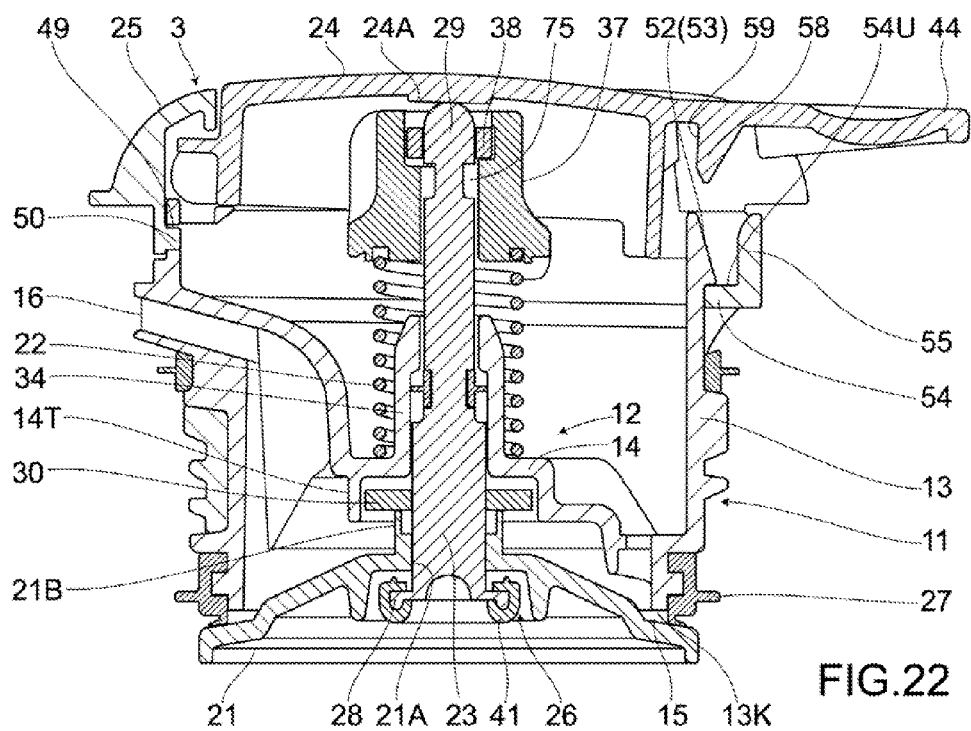
FIG. 22 is a cross-sectional view showing a state of the valve body of the first embodiment in which a pressure reducing unit has been opened.
Figure 23:
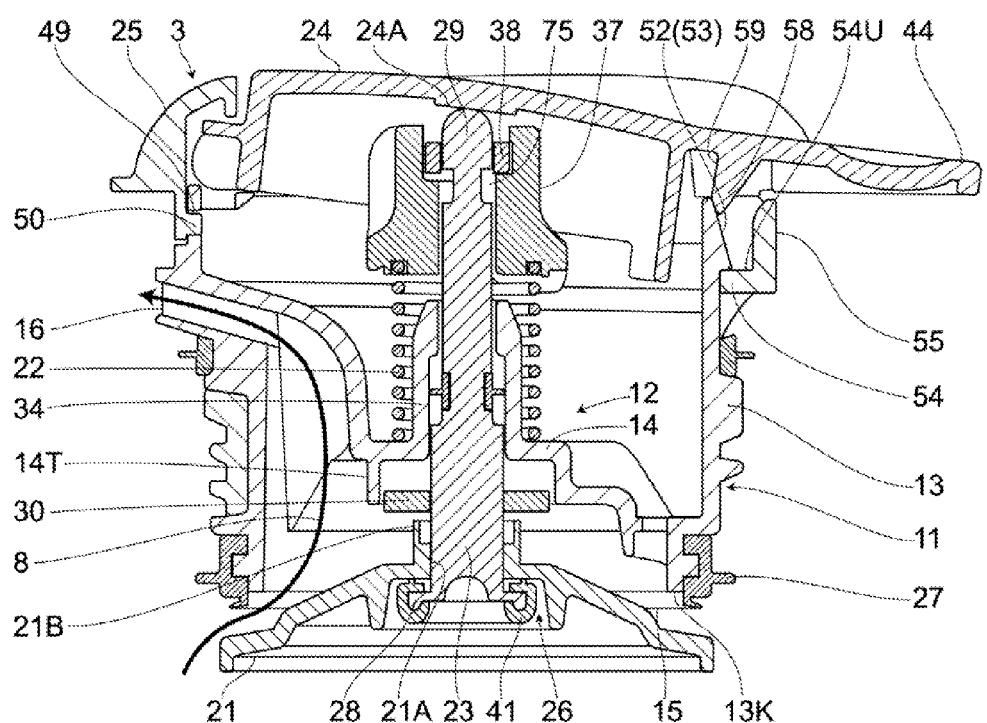
FIG. 23 is a cross-sectional view showing an opened state of the valve body of the first embodiment.

When the container main body 2 contains hot water or a hot beverage, a pressure inside such container main body 2 may increase due to water vapor. In such case, as shown in FIG. 22, by rotating the control lever 24, the pressure reducing packing 41 of a smaller area shall move away from the undersurface of the valve body 21 as the valve shah 23 descends, with the water-stop packing 27 being pressed onto the valve body 21 due to the pressure inside the container. Thus, the pressure inside the container main body 2 can be released. Here, since the vertical ventilation grooves 31T are circumferentially formed on the lower section 29S of the shaft portion 29, the pressure inside the container main body 2 can be smoothly released from between the attachment hole 21A and the ventilation grooves 31T. As a result of releasing the pressure inside the container main body 2, a pressurized holding force for holding the valve body 21 upward shall vanish, thereby causing the corresponding valve body 21 to descend due to gravity, thus, as shown in FIG. 23, allowing an opened state of the valve body 21 to be established.

Further, even when the container main body 2 contains hot water or a hot beverage, the pressure inside the container main body 2 may reduce, if leaving the beverage container 1 as it is after releasing the pressure inside the container main body 2 through discharge. Here, if a pressure reducing force is greater than the elastic restoring three of the resilient member 22, the valve shaft 23 shall automatically descend, thereby causing the pressure reducing packing 41 to move away from the undersurface of the valve body 21, thus allowing the pressure inside the container main body 2 to be released, thereby causing the corresponding pressure to become an atmospheric level.

Figure 4:
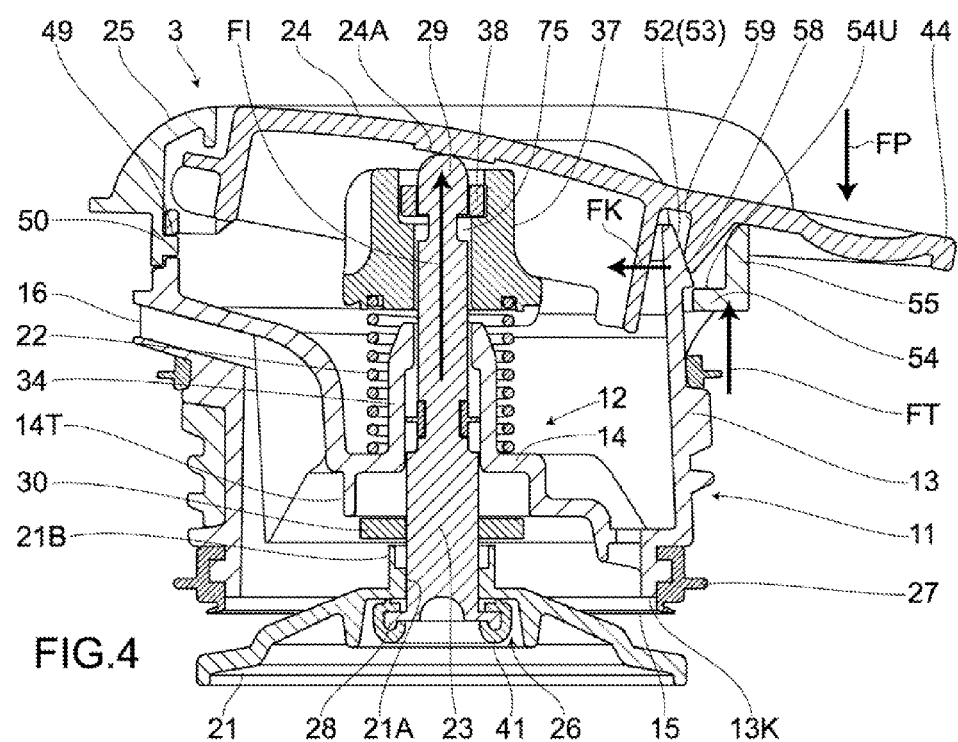
FIG. 4 is a cross-sectional view showing a state of a plug of the first embodiment in which a second engagement portion and a second engageable portion have been disengaged from each other through a protrusion section.

FIG. 4 shows the plug 3 that has been removed from the container main body 2. The engagement claw section 53 can still be engaged with the transverse-plate upper surface 54U, even after rotating the control lever 24 to the rotation restriction position that is defined when the plug 3 is attached to the container main body 2. Here, by further pushing the control portion 44 downward and then beyond the rotation restriction position, the abutment edge section 59A of the protrusion section 58 shall abut against the outer surface of the elastic section 52. There, as shown in FIG. 4, by further pushing the control lever 24 downward, the elastic section 52 shall undergo an elastic deformation inward due to the protrusion section 58, thus causing the engagement claw section 53 to disengage from the transverse-plate upper surface 54U.

Once the engagement claw section 53 has been disengaged from the transverse-plate upper surface 54U, the valve shaft 23 shall push the control lever 24 upward due to the resilient member 22, thereby causing the corresponding control lever 24 to rotate upward, thus allowing the other side of the cover 25 to disengage from the plug main body 11.

After removing the cover 25 from the plug main body 11, the valve body cover 37 can then be removed from the upper portion of the valve shaft 23, thereby allowing the valve shall 23, the resilient member 22, the valve body 21 and the engagement plate 30 to be thither removed from the plug main body 11, thus making it possible to wash the fluid passage 8 and the valve structure 12 of the plug main body 11 separately.

The valve structure 12 thus washed can then be reattached to the plug main body 11 as follows. That is, the engagement plate 30 is to be attached to the shaft portion 29 of the shaft 23, followed by successively; inserting such shaft portion 29 through the attachment hole 21A of the valve body 21, the through hole 33 and the guiding cylinder 34; fitting the resilient member 22 onto the guiding cylinder 34; placing the valve body cover 37 on top of the resilient member 22; and then engaging the upper section 29U of the shall portion 29 with the valve body cover 37.

As described above, the rotation member 38 is rotatably provided on the valve body cover 37, and the claw portions 73 are disposed on the rotation member 38 with a certain distance. Further, claw guiding grooves 74 and slanted surfaces 76, 76A, 78, 78A, 79, 79A and bottom surfaces 77, 77A are arranged in an accordion or corrugated shape around the upper portion of the valve shaft 23. Here, the slanted surfaces serve as an engagement-claw-moving slanted surface, the bottom surfaces serve as an engagement-claw engaging surface, and the claw guiding grooves 74 receive the claw portions 73. Furthermore, when inserting the valve body cover 37 downward from above the upper portion of the valve shaft 23, resisting against the biasing force from the resilient member 22 provided for biasing the fluid passage 8 in the closing direction, the claw portions 73 of the rotation member 38 are allowed to get into along the claw guiding grooves 74, thereby moving the rotation member 38 along the engagement-claw-moving slanted surface provided at the lower section of the claw guiding grooves 74 thus rotating the rotation member 38.

Then, when moving the valve both cover 37 upward, as forward biased to be the resilient member 22, the rotation member 38 is allowed to move upward to the upper portion of the engagement-claw-moving slanted surface at the lower section, and then moves along the engagement-claw-moving slanted surface provided at the upper section of the claw guiding grooves 74, thus rotating the rotation member 38. Further, the claw portions 73 abut against engagement-claw engaging surfaces, thereby engaging the valve body cover 37 with the valve shaft 23. Thus, the valve body 21 is biased upward (in the direction of closing the inlet 15 of the fluid passage 8). In this way, the valve body cover 37 is made detachable at the upper end of the valve shaft 23 in a manner of so-called "push-push mechanism", thereby eliminating, the conventional need to rotate the valve body cover 37 while pushing, thus allowing the valve body cover 37 to be attached by a single operation.

Moreover, the upper end of the valve shaft 23 is protruded out of the valve body cover 37, so that the control lever 24 never abuts against the valve body cover 37 no matter where the position of the control lever 24 is, i.e., no matter whether the valve body 21 is opened or not. Thus, the valve body cover 37 never unintentionally comes off the valve shall 23.

Additionally, the valve body 21 is a separate component from the valve shaft 23; the valve body 21 or 28 for closing the inlet 15 of the fluid passage 8 is disposed on the valve shaft 23, the fluid passage 8 extending up to an upper region of the valve body 21; and the diameter of the valve shaft 23 is formed smaller than that of the valve body 21. For these reasons, even when the inner pressure of the container main body 2 is high due to hot water or the like, this inner pressure can be released by first pushing the disk portion 28, serving as another valve body, or the valve shaft 23 downward. That is, there can be avoided such a situation that the valve body 21 becomes unable to be pushed downward due to the inner pressure, and the content fluid can thus be reliably discharged. Here, since the ventilation grooves 31T are formed on the valve shaft 23, clearances can then be formed with respect to the attachment hole 21A of the valve body 21, thus making it possible to reliably discharge the inner pressure. After releasing the inner pressure in such manner, the pressurized holding force for holding the valve body 21 upward shall vanish, thereby causing the corresponding valve body 21 to descend due to gravity, thus allowing the opened state of the valve body 21 to be established.

In contrast, when the pressure inside the container main body 2 has been reduced, the valve shaft 23 shall automatically descend if the pressure reducing force is greater than the elastic restoring force of the resilient member 22 at that time. There, the descent of the valve shaft 23 shall allow the pressure reducing packing 41 to move away from the undersurface of the valve body 21, thus allowing the pressure inside the container main body 2 to be released to the atmospheric level.

In addition, the engagement plate 30 can eliminate the need of the resilient member 104 disposed below the inner divider 14. That is, a metal coil spring provided in the fluid passage 8 and conventionally used, for example, is no longer required, thereby making the plug 3 sanitary and saving the cost thereof by reducing the number of parts thereof at the same time.

Further, the relation among strokes satisfies A>B+C (stroke A: valve body cover 37, stroke B: the valve body 21 and the engagement plate 30, stroke C: engagement claw portion 73 in the attachment location), so that when disengaging the valve body cover 37 from the valve shaft 23, the plug main body 11 and the valve body cover 37 can be prevented from abutting against each other, thus preventing the rotation member 38 from failing to rotate to a disengagement location.

For this reason, disassembling handleability becomes easier because user's one band manipulates the valve body cover 37 in a push-push manner while the other hand just push the valve body 21 which has larger area than that of the disk portion 28 of the valve shaft 23.

Furthermore, the valve shaft 23 is provided with the vertical grooves 31 serving as an engagement plate inserting groove and the engagement grooves 31A circumferentially and continuously provided at the tower ends of the vertical grooves 31, thereby allowing the engagement plate 30 to be detachable from the valve shaft 23, thus improving cleaning processes of the plug 3.

According to the present embodiment corresponding to the first aspect, the plug includes: a plug main body 11 detachably attached to an opening section 2A of the container main body 2; a fluid passage 8 formed inside the plug main body 11, and extending from an inlet 15 open toward an inner side of said container main body 2 to an outlet 16 open toward an outer side of the plug main body 11; a valve body 21 biased in a direction allowing the inlet 15 of the fluid passage 8 to be closed; a cover 25 that is provided, on an upper end of the plug main body 11 and serves to cover an upper opening section of the plug main body 11; an operation lever 24 serving as an opening and closing device provided on the cover 25; a resilient member 22 that is provided on the valve body 21 and serves to bias the valve body 21 in a closing direction; a valve body cover 37 attached to the valve body 21 in order to prevent the resilient member from coming off; a rotation member 38 rotatably provided on the valve body cover 37; at least two engagement claw portions 73 that are provided on the rotation member 38 and serve to allow the valve body cover 37 to be engaged with an upper portion of the valve body 21; and claw guiding grooves 74 and the recessed grooves 75 serving as steps that are provided on an upper portion of the valve body 21, the number of the claw guiding grooves 74 being equal to the number of or the integral multiple of the engagement claw portions 73, the recessed grooves 75 allowing the rotation member 38 to rotate. In this way, the valve body cover 37 is detached by moving the valve body cover 37 up and down. As a result, holding the valve body cover 37 and moving it up and down causes the rotation member 38 to be rotated by the recessed grooves 75 and the engagement claw portions 73, thereby detaching the valve body cover 37 from the valve body 21, thus allowing the valve body 21 of the plug main body 11 to be easily disassembled.

According to the present embodiment corresponding to the second aspect, when the valve body cover 37 is attached to the valve body 21, an upper end of the shaft portion 29 serving as the upper end of the valve body 21 is protruded from an upper portion of the valve body cover 37, thereby allowing the valve body cover 37 not to abut against the operation lever 24 serving as an opening and closing device. Therefore, no matter whether the valve body 21 is open or not, the valve body cover 37 cannot be unintentionally disengaged from the valve body 21 because the operation lever 24 does not contact with the valve body cover 37.

According to the present embodiment corresponding to the third aspect, the valve body 21 is a separate component from the valve shaft 23, and the valve shall 23 is provided with the disk portion 28 which closes the inlet 15 of the fluid passage 8 above the valve body 21. Also, the diameter of the valve shaft 23 is formed smaller than that of the valve body 21. For these reasons, even when the inner pressure of the container main body 2 is high due to hot water or the like, this inner pressure can be released by first pushing a valve body 21 of the valve shall 23 downward. That is, there can be avoided a situation where the valve body 21 fails to be pushed downward due to the inner pressure, and the content fluid can thus be reliably discharged.

According to the present embodiment corresponding to the forth aspect, the valve body 21 is a separate component from the valve shaft 23 and, there is provided an engagement plate 30 that abuts against the valve body 21 and pushes down the valve body 21 when pushing down the valve shall 23. Using the engagement plate 30, the resilient member 104 is unnecessary. That is, a metal coil spring provided in the fluid passage 8 and conventionally used, for example, is unnecessary, thereby making the plug sanitary and saving the cost thereof h removing the member of parts thereof at the same time.

According to the present embodiment, one of advantageous effects is to easily attach the rotation member 38 to the valve body cover 37 by providing engagement opening sections 72A, 72A on the right and left finger grips 72, 72 of the valve body cover 37 such that the engagement opening sections 72A, 72A are engaged with the rotation member 38. Another advantageous effect is to hold the right and left finger grips 72, 72 and push down the valve body cover 37 by extending, the lower portions 72S, 72S of the right and left finger grips 72, 72 outward so as to easily apply a force from above. Furthermore, another advantageous effect is to reliably release the inner pressure by providing vertical grooves 31 on the valve shaft 23 so as to form a space between the valve shaft 23 and the attachment hole 21A.

As described in the present embodiment, by simply pushing the control lever 24 downward, the protrusion section 58 provided thereon shall push the elastic section 52 of the plug main body 11 in an disengagement direction FK, thus allowing the cover 25 and the plug main body 11 to disengage from each other.

At that time, since the valve shaft 23 of the valve body 21 is biased in a direction allowing the inlet 15 of the fluid passage 8 to be closed, not only the cover 25 and the plug main body 11 can disengage from each other, but a force enabling disengagement from the plug main body 11 is generated in a disengagement direction FI and is then applied to the control lever 24 and the cover 25. That is, an easy disassembly is possible by manipulating the control lever 24.

Further, although the valve body 21 can be either opened or closed by manipulating the control lever 24 with the plug 3 being attached to the container main body 2, the protrusion section 58 of the control lever 24 is allowed to stop short of disengaging the elastic section 52 at the rotation restriction position where the control lever 24 abuts against, the shoulder member 7, thus preventing the plug main body 11 and the cover 25 from disengaging from each other due to an erroneous manipulation.

Furthermore, since the elastic section 52 is arranged on an inner side of a largest outer diameter of the plug main body 11, and since the protrusion section 58 can enter an inner side of the cover 25 when pushing the control lever 24 downward, the protrusion section 58 can be hidden inside the cover 25, thus not only improving an outer appearance, but also avoiding, from the perspective of safety, a contact with the protrusion section 58 when manipulating the control lever 24. Moreover, the transverse plate section 54 is disposed on a lower region of the cover 25. Therefore, the control lever 24 and such transverse plate section 54 are to be squeezed against each other when performing disengagement. Thus, a force FP for pushing the control lever 24 and forces FT for pinching the cover 25 shall cancel each other out such that only a force for closing the valve body 21 shall be applied to the control lever 24 and the cover 25. For this reason, the plug main body 1 and the cover 25 can be easily disassembled from each other.

Another advantageous effect is described as follows. The present embodiment is a plug of a fluid container. Specifically, formed inside the plug main body 11 that is detachably attached to the upper opening section 2A of the container main body 2, is the fluid passage 8 connecting the inlet 15 and the outlet 16, the inlet 15 and the owlet 16 being respectively opened toward an inner side and an outer side of the container main body 2. Also provided inside the plug main body 11 is the valve body 21 biased in the direction allowing the inlet 15 of the fluid passage 8 to be closed. The cover 25 for closing the upper opening section 42 is disposed on an upper end of the plug main body 11. Further, provided on such cover 25 is the control lever 24 capable of being pushed downward and used to either open or close the valve body 21. While the transverse hole 49 serving as the first engagement portion is provided on either one of the plug main body 11 and the cover 25, the protruding portion 50 serving as the first engageable portion that is engageable with the first engagement portion is provided on the other. Here, the elastic section 52 is thrilled on the upper portion of the plug main body 11. Particularly, while the engagement claw section 53 serving as the second engagement portion is provided on either one of the elastic section 52 of the plug main body 11 and the cover 25, the transverse-plate upper surface 54U serving as the second engageable portion that is engageable with the second engagement portion is provided on the other. The control lever 24 includes the protrusion section 58 capable of: abutting against the elastic section 52 as the result of pushing the control lever 24 downward; and then pushing such elastic section 52 in the disengagement direction. That is, by pushing the control lever 24 downward, the protrusion section 58 thereof shall push the elastic section 52 of the plug main body 11 in the disengagement direction, thus allowing the engagement claw section 53 to disengage from the transverse-plate upper surface 54U. At that time, since the control lever 24 is biased upward by the valve body 21, the cover 25 can be easily removed from the plug main body 11.

Here, a guiding slanted surface(s) may be formed on the lower portion of the protruding portion 50. In such case, since the protrusion section 48 having the transverse hole 49 is elastic, the cover 25 can be substantially simultaneously engaged with and fixed to a front and rear sections of the plug main body 11 by simply pressing the cover 25 against the plug main body 11 from above.

Further, the present embodiment allows the valve body 21 to be either opened or closed, by pushing, the control lever 24 downward with the plug main body 11 being attached to the container main body 2. However, since the control portion 44 of the control lever 24 shall abut against the shoulder member 7, the protrusion section 58 is allowed to stop short of disengaging the elastic section 52. That is, while the valve body 21 can be opened by pushing the control lever 24 at an initial position downward through the control portion 44, it can be closed by releasing such control lever 24. Specifically, the valve body 21 closes as the control lever 24 returns to its initial position due to the valve body 21 itself that is biased upward. In addition, the control portion 44 shall abut against the shoulder member 7 even when pushing the control lever 24 downward with the plug main body 11 being attached to the container main body 2, thus preventing the engagement claw section 53 and the transverse-plate upper surface 54U from being disengaged from each other. Namely, the disengagement of the cover 25 shall not occur even when pushing the control lever 24 at the point of use.

Furthermore, the elastic section 52 of the present embodiment is arranged on the inner side of the outermost diameter, i.e., largest outer diameter of the plug main body 11. Therefore, the protrusion section 58 can enter the inner side of the cover 25 when pushing the control lever 24 downward, thus improving the outer appearance as well as a design property at the point of use.

Moreover, the protruding portion 50 of the cover 25 that protrudes toward the other side is to be engaged with the transverse hole 49 formed on one side of the plug main body 11, from one side of such transverse hole 49. For this reason, the plug main body 11 and the cover 25 can easily engage with each other on the other side as a result of pushing the other side of such cover 25 downward while employing an engagement point of the protruding portion 50 and the transverse hole 49 as a pivot point. Further, since the transverse hole 49 is formed in a transverse direction, and since the protruding portion 50 that is also formed in the transverse direction is to be engaged with such transverse hole 49, a stable rotation becomes possible while employing the aforementioned engagement point as a rotation pivot point. Furthermore, the vertical edge portion 59 is provided on one side of the protrusion section 58. Particularly, the vertical edge portion 59 is provided in the location allowing the protrusion section 58 to engage with the elastic section 52 when manipulating the control lever 24. More particularly, provided on the lower portion of the vertical edge portion 59 is the abutment edge section SPA slanting from top down to the other side. Here, the central slanted surface 53A is formed on the other side of the engagement claw section 53. Accordingly, the abutment edge section 59A can abut against such central slanted surface 53A as the protrusion section 58 descends, thereby allowing the elastic section 52 to be elastically deformed toward one side, thus resulting in a smooth disengagement on the other side.

Second Embodiment

Figure 24:
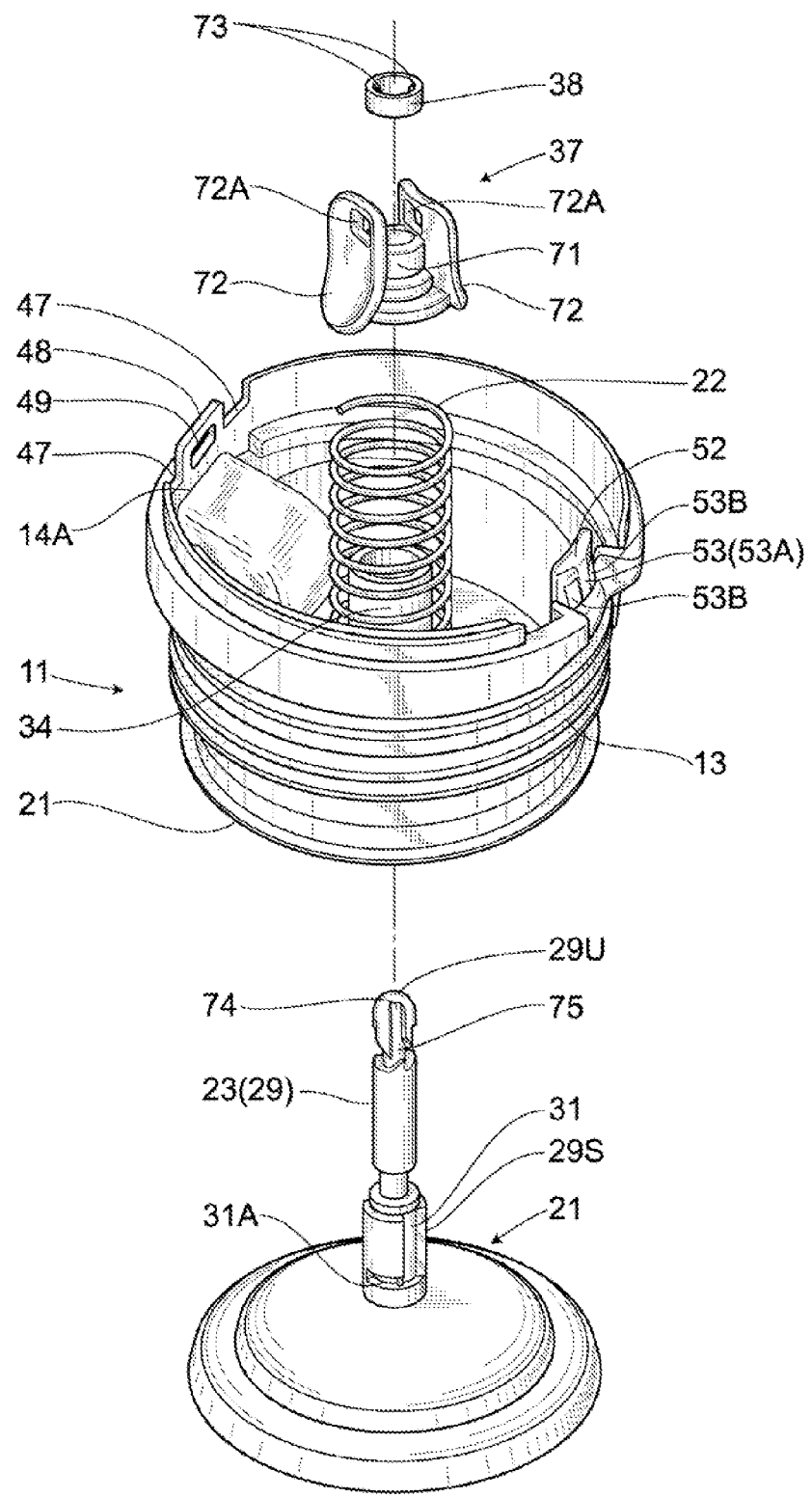
FIG. 24 is an exploded perspective view of the plug main body showing a second embodiment of the present invention.

FIG. 24 and FIG. 25 show the second embodiment of the present invention. Compared to the first embodiment, the same numbers are applied to the same parts in the second embodiment, and descriptions of the same parts thereof are skipped. The second embodiment is an example that the valve body 21 and the valve shaft 23 are integrally formed. According to this example, the shaft portion 29 of the valve shaft 23 is protrudedly provided on the center of the valve body 21, and the pressure reducing unit 26 and the engagement plate 30 are not provided. Also, according to this example, since the engagement plate 30 is not provided, it is not necessary that the shaft portion 29 is provided with the vertical grooves 31, 31 and the engagement grooves 31A, 31A.

According to the second embodiment, the plug also includes: a resilient member 22 that is provided on the valve body 21 and serves to bias the valve body 21 in a closing direction; a valve body cover 37 attached to the valve body 21 in order to prevent the resilient member 22 from coming off; a rotation member 38 rotatably provided on the valve body cover 37; at least two engagement claw portions 73 that are provided on the rotation member 38 and serve to allow the valve body cover 37 to be engaged with an upper portion of the valve body 21; and claw guiding grooves 74 and the recessed grooves 75 sewing as steps that are provided on an upper portion of the valve body 21, the number of the claw guiding grooves 74 being equal to the number of or the integral multiple of the engagement claw portions 73, the recessed grooves 75 allowing the rotation member 38 to rotate. Therefore, the valve body cover 37 can be detached from the valve body 21, thus allowing the valve body 21 of the plug main body 11 to be easily disassembled. The second embodiment has the same advantageous effects as the first embodiment according to the first and second aspects.

The present invention is not limited to the present embodiment. In fact, various modified embodiments are possible within the scope of the present invention. For example, the plug of the present invention is not limited to that used in a thermos bottle. As a matter of fact, the plug of the present invention can also be used in a water flask or the like. Here, the container main both may be made of glass, a synthetic resin or the like. However, the container main body does not need to have a heat-insulated structure.

What is claimed:

1. A plug for use in a beverage container having a container main body, comprising:
    a plug main body detachably attached to an opening section of said container main body;
    a fluid passage formed inside said plug main body, and extending from an inlet open toward an inner side of said container main body to an outlet open toward an outer side of said plug main body;
    a valve body biased in a direction allowing the inlet of said fluid passage to be closed;
    a cover that is provided on an upper end of said plug main body and serves to cover an upper opening section of said plug main body;
    an opening and closing device provided on said cover;
    a resilient member that is provided on said valve body and serves to bias said valve body in a closing direction;
    a valve body cover attached to said valve body in order to prevent said resilient member from coming off;
    a rotation member rotatably provided on said valve body cover;
    at least two claw portions that are provided on said rotation member and serve to allow the valve body cover to be engaged with a valve shaft of the valve body; and
    claw guiding grooves and steps that are provided on an upper portion of said valve body, the number of said claw guiding grooves being equal to the number of or the integral multiple of said claw portions, said steps allowing the rotation member to rotate,
    wherein said valve body cover is detachable by moving the valve body cover up and down.

2. The plug for use in a beverage container according to claim 1, wherein when said valve body cover is attached to said valve body, an upper end of said valve body is protruded from an upper portion of said valve body cover, thereby allowing said valve body cover not to abut against said opening and closing device.

3. The plug for use in a beverage container according to claim 1, wherein said valve body is a separate component from said valve shaft such that said valve shall is provided with said valve body which closes the inlet of said fluid passage above said valve body.

4. The plug for use in a beverage container according to claim 2, wherein said valve body is a separate component from said valve shaft and, there is provided an engagement plate that abuts against said valve body and pushes down said valve body when pushing down said valve shaft.

5. The plug for use in a beverage container according to claim 2, wherein said valve body is a separate component from said valve shaft, and said valve shaft is provided with said valve body which closes the inlet of said fluid passage above said valve body.

6. The plug for use in a beverage container according to claim 2, wherein said valve body is a separate component from said valve shaft and, there is provided an engagement plate that abuts against said valve body and pushes down said valve body when pushing down said valve shaft.

7. The plug for use in a beverage container according to claim 3, wherein said valve body is a separate component from said valve shaft and, there is provided an engagement plate that abuts against said valve body and pushes down said valve body when pushing down said valve shaft.

8. The plug for use in a beverage container according to claim 1, wherein said valve body cover includes right and left finger-grips, and engagement openings detachably engaged with said rotation member are provided at the right and left finger-grips.

9. The plug for use in a beverage container according to claim 2, wherein said valve body cover includes right and left finger-grips, and engagement openings detachably engaged with said rotation member are provided at the right and left finger-grips.

10. The plug for use in a beverage container according to claim 8, wherein lower portions of the right and left finger-grips extend outward.

11. The plug for use in a beverage container according to claim 9, wherein lower portions of the right and left finger-grips extend outward.

* * * * *